United States Patent
Etwaru et al.

(10) Patent No.: US 11,586,835 B2
(45) Date of Patent: Feb. 21, 2023

(54) INTEGRATING OVERLAID TEXTUAL DIGITAL CONTENT INTO DISPLAYED DATA VIA GRAPHICS PROCESSING CIRCUITRY USING A FRAME BUFFER

(71) Applicant: MOBEUS INDUSTRIES, INC., Sparta, NJ (US)

(72) Inventors: Dharmendra Etwaru, Sparta, NJ (US); Michael R. Sutcliff, Inlet Beach, FL (US)

(73) Assignee: MOBEUS INDUSTRIES, INC., Sparta, NJ (US)

( * ) Notice: Subject to any disclaimer, the term of this patent is extended or adjusted under 35 U.S.C. 154(b) by 0 days.

(21) Appl. No.: 17/675,975

(22) Filed: Feb. 18, 2022

(65) Prior Publication Data

US 2022/0350974 A1 Nov. 3, 2022

Related U.S. Application Data

(60) Provisional application No. 63/248,800, filed on Sep. 27, 2021, provisional application No. 63/222,757, (Continued)

(51) Int. Cl.
*G06F 40/58* (2020.01)
*G06V 30/146* (2022.01)
(Continued)

(52) U.S. Cl.
CPC .............. *G06F 40/58* (2020.01); *G06V 30/147* (2022.01); *G09G 5/397* (2013.01); *G06T 1/20* (2013.01)

(58) Field of Classification Search
CPC ...... G06F 40/58; G06V 30/147; G09G 5/397; G06T 1/20
(Continued)

(56) References Cited

U.S. PATENT DOCUMENTS

| 7,013,428 B1 | 3/2006 | Kamen |
| 8,813,154 B1 | 8/2014 | Sivertsen |

(Continued)

OTHER PUBLICATIONS

International Search Report and Written Opinion of the International Searching Authority dated Nov. 23, 2021, in PCT/US 21/46976, filed Aug. 20, 2021, 10 pages.
(Continued)

*Primary Examiner* — William A Beutel
*Assistant Examiner* — Kim Thanh T Tran
(74) *Attorney, Agent, or Firm* — Oblon, McClelland, Maier & Neustadt, L.L.P.

(57) ABSTRACT

An apparatus, method, and computer readable medium for generating and displaying a dynamic language translation overlay that include accessing a frame buffer of the GPU, analyzing, in the frame buffer of the GPU, a frame representing a section of a stream of displayed data that is being displayed by a display device, based on the analyzed frame, identifying a reference patch that includes an instruction to identify an object comprising original text, based on the instruction included in the reference patch, recognizing the original text, generating translated text, generating an overlay comprising an augmentation layer, the augmentation layer including the translated text, and overlaying the overlay, onto the displayed data such that the translated text is viewable while the original text is obscured from view.

19 Claims, 18 Drawing Sheets

Related U.S. Application Data filed on Jul. 16, 2021, provisional application No. 63/182,391, filed on Apr. 30, 2021.

(51) Int. Cl.
  *G09G 5/397* (2006.01)
  *G06T 1/20* (2006.01)
(58) Field of Classification Search
  USPC .......................................................... 345/529
  See application file for complete search history.

(56) References Cited

U.S. PATENT DOCUMENTS

| | | | |
|---|---|---|---|
| 9,325,809 B1 | 4/2016 | Barros et al. | |
| 9,411,789 B1 | 8/2016 | Chitta | |
| 9,792,895 B2 | 10/2017 | Khintsitskiy | |
| 9,924,236 B2 | 3/2018 | Nguyen | |
| 10,089,633 B2 | 10/2018 | Thlyagarajan | |
| 10,236,006 B1 | 3/2019 | Gurijala et al. | |
| 10,567,733 B2 | 2/2020 | Cole | |
| 10,742,634 B1 | 8/2020 | Shahbazi et al. | |
| 10,853,903 B1 | 12/2020 | Deshmukh | |
| 11,064,149 B1 | 7/2021 | Paun | |
| 2002/0056136 A1 | 5/2002 | Wistendahl et al. | |
| 2003/0234790 A1 | 12/2003 | Hochmuth | |
| 2004/0130552 A1 | 7/2004 | Duluk, Jr. et al. | |
| 2005/0219241 A1 | 10/2005 | Chun | |
| 2006/0242607 A1 | 10/2006 | Hudson | |
| 2007/0009179 A1 | 1/2007 | Easwar | |
| 2007/0156708 A1 | 7/2007 | Takayama | |
| 2008/0066092 A1 | 3/2008 | Laude et al. | |
| 2008/0137848 A1 | 6/2008 | Kocher et al. | |
| 2008/0140714 A1 | 6/2008 | Rhoads et al. | |
| 2008/0152016 A1 | 6/2008 | Nagahara | |
| 2009/0245516 A1 | 10/2009 | Ravikiran | |
| 2010/0153848 A1 | 6/2010 | Saha | |
| 2011/0304646 A1 | 12/2011 | Kato | |
| 2012/0032977 A1 | 2/2012 | Kim et al. | |
| 2012/0088543 A1* | 4/2012 | Lindner | G06F 40/58 704/260 |
| 2012/0095958 A1 | 4/2012 | Pereira et al. | |
| 2012/0114249 A1 | 5/2012 | Conwell | |
| 2012/0169928 A1 | 7/2012 | Casagrande et al. | |
| 2012/0207208 A1 | 8/2012 | Wyatt | |
| 2012/0272279 A1 | 10/2012 | Lim | |
| 2013/0044129 A1 | 2/2013 | Latta et al. | |
| 2013/0047180 A1 | 2/2013 | Moon et al. | |
| 2013/0183952 A1 | 7/2013 | Davis et al. | |
| 2013/0294648 A1 | 11/2013 | Rhoads et al. | |
| 2014/0172429 A1 | 6/2014 | Butcher et al. | |
| 2014/0201769 A1 | 7/2014 | Neumeier et al. | |
| 2014/0304316 A1 | 10/2014 | Thulasiraman et al. | |
| 2015/0039993 A1 | 2/2015 | Ishimaru | |
| 2015/0074735 A1 | 3/2015 | Herigstad et al. | |
| 2015/0097850 A1 | 4/2015 | Craik et al. | |
| 2015/0113557 A1 | 4/2015 | Kim | |
| 2015/0163345 A1 | 6/2015 | Cornaby | |
| 2015/0195288 A1 | 7/2015 | Hoyos et al. | |
| 2015/0287220 A1 | 10/2015 | Jain et al. | |
| 2015/0034141 A1 | 11/2015 | Schrempp | |
| 2015/0319510 A1 | 11/2015 | Ould Dellahy, VIII | |
| 2015/0358525 A1 | 12/2015 | Lord | |
| 2016/0109954 A1 | 4/2016 | Harris | |
| 2016/0328871 A1 | 11/2016 | Chen | |
| 2017/0026621 A1 | 1/2017 | Vellanki et al. | |
| 2017/0052654 A1 | 2/2017 | Cervelli et al. | |
| 2017/0155933 A1 | 6/2017 | Del Strother | |
| 2017/0185251 A1 | 6/2017 | Jain | |
| 2017/0195753 A1 | 7/2017 | Dakss | |
| 2017/0255614 A1* | 9/2017 | Vukosavljevic | G06F 40/58 |
| 2017/0278289 A1 | 9/2017 | Marino et al. | |
| 2017/0304725 A1 | 10/2017 | Perlman et al. | |
| 2017/0344552 A1 | 11/2017 | Golbandi | |
| 2018/0004204 A1 | 1/2018 | Rider | |
| 2018/0046602 A1 | 2/2018 | Sisson | |
| 2018/0096502 A1 | 4/2018 | Kansara | |
| 2018/0122114 A1 | 5/2018 | Luan et al. | |
| 2018/0124370 A1 | 5/2018 | Bejot | |
| 2018/0143950 A1 | 5/2018 | Al-Arnaouti et al. | |
| 2018/0150696 A1 | 5/2018 | Li | |
| 2018/0189922 A1 | 7/2018 | Chinnadurai et al. | |
| 2018/0219814 A1 | 8/2018 | Maarek | |
| 2018/0307846 A1 | 10/2018 | Hertling et al. | |
| 2018/0308257 A1 | 10/2018 | Boyce | |
| 2018/0343481 A1 | 11/2018 | Loheide et al. | |
| 2019/0065152 A1 | 2/2019 | Jaroch | |
| 2019/0206113 A1 | 7/2019 | Kipp et al. | |
| 2019/0207885 A1 | 7/2019 | Kozhemiak et al. | |
| 2019/0213625 A1 | 7/2019 | Bhattacharjee | |
| 2019/0236816 A1 | 8/2019 | Wang et al. | |
| 2019/0259124 A1 | 8/2019 | Barnett | |
| 2019/0295208 A1 | 9/2019 | Hoatry | |
| 2019/0317763 A1 | 10/2019 | Sakamoto et al. | |
| 2019/0332883 A1 | 10/2019 | Ivanovic | |
| 2019/0335233 A1 | 10/2019 | Harvey | |
| 2020/0110482 A1 | 4/2020 | Vu et al. | |
| 2020/0162788 A1 | 5/2020 | Cremer | |
| 2020/0169736 A1 | 5/2020 | Petajan | |
| 2020/0184658 A1 | 6/2020 | Cui | |
| 2020/0245021 A1 | 7/2020 | Kitazato | |
| 2020/0257920 A1 | 8/2020 | Kumar et al. | |
| 2020/0273251 A1 | 8/2020 | Palos et al. | |
| 2020/0389293 A1 | 12/2020 | Lambert et al. | |
| 2020/0396521 A1 | 12/2020 | Weiner et al. | |
| 2021/0004650 A1 | 1/2021 | Frank | |
| 2021/0168416 A1 | 6/2021 | Weiner | |
| 2021/0192302 A1 | 6/2021 | Wang | |
| 2021/0200501 A1 | 7/2021 | Stankoulov | |
| 2021/0344991 A1 | 11/2021 | Todd | |
| 2022/0019780 A1* | 1/2022 | Ozserin | G06V 10/25 |
| 2022/0067415 A1 | 3/2022 | Kerofsky | |
| 2022/0105193 A1 | 4/2022 | Li et al. | |
| 2022/0114584 A1 | 4/2022 | Conley et al. | |
| 2022/0138994 A1 | 5/2022 | Viswanathan et al. | |

OTHER PUBLICATIONS

International Search Report and Written Opinion of the International Searching Authority dated Jun. 1, 2022, in PCT/US 22/20244, filed Mar. 14, 2022, 12 pages.

International Search Report and Written Opinion of the International Searching Authority dated Jun. 9, 2022, in PCT/US 22/20226, filed Mar. 14, 2022, 12 pages.

International Search Report and Written Opinion of the International Searching Authority dated Jun. 9, 2022, in PCT/US 22/20234, filed Mar. 14, 2022, 8 pages.

International Search Report and Written Opinion of the International Searching Authority dated Jun. 9, 2022, in PCT/US 22/20184, filed Mar. 14, 2022, 8 pages.

International Search Report and Written Opinion of the International Searching Authority dated Jun. 3, 2022, in PCT/US 2022/020254, filed Mar. 14, 2022, 13 pages.

International Search Report and Written Opinion of the International Searching Authority dated Jun. 7, 2022, in PCT/US 2022/022840, filed Mar. 31, 2022, 8 pages.

International Search Report and Written Opinion of the International Searching Authority dated Jul. 20, 2022, in PCT/US22/20263, filed Mar. 14, 2022, 9 pages.

International Search Report and Written Opinion of the International Searching Authority dated Aug. 3, 2022, in PCT/US22/20215, filed Mar. 14, 2022, 10 pages.

International Search Report and Written Opinion of the International Searching Authority dated Aug. 1, 2022, in PCT/US22/20267, filed Mar. 14, 2022, 12 pages.

International Search Report and Written Opinion of the International Searching Authority dated Jul. 7, 2022, in PCT/US22/20258, filed Mar. 14, 2022, 9 pages.

Demuynck et al., 'Magic Cards: A New Augmented—Reality Approach', IEEE Computer Graphics and Applications, pp. 12-19. (Year: 2013).

(56) References Cited

OTHER PUBLICATIONS

Oh et al., 'CAMAR: Context-aware Mobile Augmented Reality in Smart Space', IWUVR, pp. 48-51. (Year: 2009).

* cited by examiner

INTEGRATING OVERLAID TEXTUAL DIGITAL CONTENT INTO DISPLAYED DATA VIA GRAPHICS PROCESSING CIRCUITRY USING A FRAME BUFFER

CROSS REFERENCE TO RELATED APPLICATIONS

The present application claims priority to U.S. Provisional Application No. 63/248,800, filed Sep. 27, 2021, U.S. Provisional Application No. 63/222,757, filed Jul. 16, 2021, and U.S. Provisional Application No. 63/182,391, filed Apr. 30, 2021, the entire content of each of which is incorporated by reference herein in its entirety for all purposes.

BACKGROUND

Field of the Disclosure

The present disclosure relates to a method, device, and computer-readable medium of forming a dynamic translation overlay of text displayed on a display device.

Description of the Related Art

When viewing presentations on screenshares, typically there is only one language in play. The verbally spoken language as well as the language on shared presentation materials is all in a single language. This limits communication and expression as most presentations in a global setting are presented in a variety of first-languages.

The foregoing "Background" description is for the purpose of generally presenting the context of the disclosure. Work of the inventors, to the extent it is described in this background section, as well as aspects of the description which may not otherwise qualify as prior art at the time of filing, are neither expressly or impliedly admitted as prior art against the present disclosure.

SUMMARY

According to an embodiment, the present disclosure relates to an apparatus for providing a dynamic translation display overlay. The apparatus comprises processing circuitry, including a graphics processing unit (GPU), configured to access a frame buffer of the GPU, analyze, in the frame buffer of the GPU, a frame representing a section of displayed data that is being displayed by the apparatus, based on the analyzed frame, identify a reference patch that includes an instruction to identify an object comprising original text, based on the instruction included in the reference patch, recognize the original text, generate translated text by translating the original text, generate an overlay comprising an augmentation layer, the augmentation layer including the translated text, and overlay the overlay, which comprises the translated text, onto the displayed data such that the translated text is viewable while the original text is obscured from view.

According to an embodiment, the present disclosure relates to a method for providing a dynamic translation display overlay, the method comprising accessing a frame buffer of the GPU, analyze, in the frame buffer of the GPU, a frame representing a section of displayed data that is being displayed by the apparatus, based on the analyzed frame, identifying a reference patch that includes an instruction to identify an object comprising original text, based on the instruction included in the reference patch, recognizing the original text, generating translated text by translating the original text, generating an overlay comprising an augmentation layer, the augmentation layer including the translated text, and overlaying the overlay, which comprises the translated text, onto the displayed data such that the translated text is viewable while the original text is obscured from view.

According to an embodiment, the present disclosure relates to a computer readable medium for storing computer-readable instructions that, when executed by a computer, cause the computer to perform a method for providing a dynamic translation display overlay, the method comprising accessing a frame buffer of the GPU, analyze, in the frame buffer of the GPU, a frame representing a section of displayed data that is being displayed by the apparatus, based on the analyzed frame, identifying a reference patch that includes an instruction to identify an object comprising original text, based on the instruction included in the reference patch, recognizing the original text, generating translated text by translating the original text, generating an overlay comprising an augmentation layer, the augmentation layer including the translated text, and overlaying the overlay, which comprises the translated text, onto the displayed data such that the translated text is viewable while the original text is obscured from view.

The foregoing paragraphs have been provided by way of general introduction and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION

Figure 1:
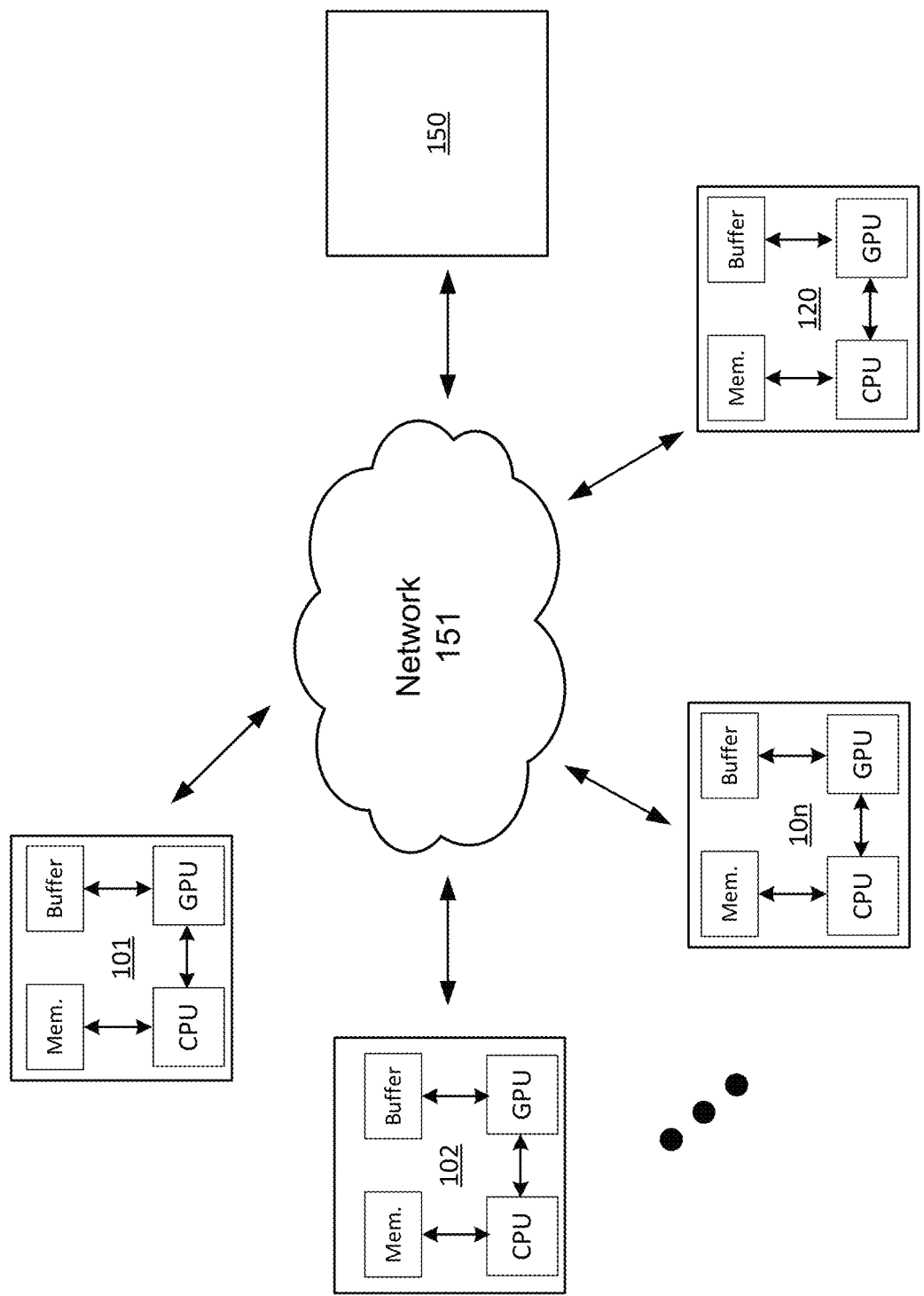
FIG. 1 is a schematic view of user devices communicatively connected to a server, according to an exemplary embodiment of the present disclosure.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). Reference throughout this document to "one embodiment", "certain embodiments", "an embodiment", "an implementation", "an example" or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics can be combined in any suitable manner in one or more embodiments without limitation.

In order to realize the augmentation of a digital user experience, a reference patch, that is a region of interest acting as an anchor, can be used. In one embodiment, the reference patch or other visually detectable element may serve to indicate a position at which digital content is to be placed onto a display. In some embodiments and as described herein, the reference patch may include encoded information that may be used to retrieve digital content and place that digital content into a desired location or locations in displayed data. The reference patch can be embedded within displayed data (such as, but not limited to, an image, a video, a document, a webpage, or any other application that may be displayed by an electronic device). The reference patch can include unique identifying data, a marker, or encoding corresponding to predetermined digital content. The reference patch can indicate to the electronic device the particular content that is to be displayed, the position at which the content is to be placed, and the size with which the content is to be displayed. Accordingly, when a portion of the displayed data including the reference patch is visible in a current frame of displayed data, the corresponding augmentation can be overlaid on the current frame of the displayed data wherein the augmentation includes secondary digital content (i.e., content that is secondary to (or comes after) the primary displayed data), herein referred to as "digital content," and/or digital objects. For example, an augmentation can include additional images to be displayed with the current frame of displayed data for a seamless visual experience.

According to an embodiment, the present disclosure relates to augmentation of a digital user experience via processing circuitry using a frame buffer of a graphics processing unit (GPU) and/or computer memory, the augmentation comprising the dynamic language translation of text. The augmentation includes an overlaying of one or more digital objects onto a viewable display area of a display of an electronic device. These digital objects comprise translated text. This overlaying can be achieved through the generation and displaying of an overlay comprising one or more augmentation layers, the augmentation layers each comprising one or more digital objects and including the translated text. The electronic device can be a mobile device such as a smartphone, tablet, and the like, a portable computer such as a laptop, a desktop computer, a monitor or displayed attached to one or more of the aforementioned devices, or any other electronic device that displays information.

Described herein are an apparatus, a method, and a non-transitory computer readable medium for storing computer-readable instructions for generating and displaying a dynamic translation display overlay.

In an exemplary embodiment, the dynamic translation display overlay can be used as part of a meeting, presentation, lecture, class, or other suitable situation in which information is conveyed from an information provider (e.g. presenter, lecturer, teacher, professor, speaker, etc.) to one or more information recipients (e.g. audience, meeting attendees, students in class, etc.). The information can comprise visual information such as text, images, videos, etc. and/or auditory information such as a voice-over, live commentary, explanation, etc. The information recipients, however, may not be able to communicate in the language of information provider. Obviously this causes a problem in that the information cannot be comprehensibly conveyed. While in such a situation, comprehensible auditory information can be provided by translation services such as a translated audio feed or closed captioning, the visual information, particularly text, provided by the information provider remains in a language which is not understood by one or more of the information recipients. This obviously creates a problem for comprehensible information transfer which can be referred to as the "untranslated text problem".

One possible method of solving the untranslated text problem is to provide a pre-translated copy, transcript, or other suitable visual information supplement which contains a translation of the displayed text. This method of solving the untranslated text problem, however, has a number of disadvantages which may present undesirable barriers to communication. For example, the supplement may not be viewable at the same time as other visual information displayed by the information provider. A separate document or window may be necessary for viewing the supplement. The information recipient may have to divert attention to another area of the display. This situation makes it impossible for an information recipient to view non-text visual information displayed by the information provider and the translated text comprehensible to the information recipient simultaneously. The supplement can be costly to produce. The supplement can require large amounts of time to produce. A distinct supplement can be required for each individual language of the information recipients. Further, the information must be provided to generate the supplement, meaning that the supplement cannot be updated or have additional information added in real time.

The content of the present disclosure provides a solution to the untranslated text problem which can avoid the specific disadvantages of the method described above or other methods of solving the untranslated text problem and can avoid other disadvantages which may be present in the method described above and such other methods. The present disclosure is directed to an apparatus, method, and computer-readable medium that automatically detects all texts in visual information such as shared presentations (original text), dynamically translates the texts into one or more languages (based on the particular recipient(s)/audience), and displays the translated text in a display layer "floating above" the original displayed visual information, such that each information recipient sees the visual information (e.g. presentation) displayed in the language of his/her choosing.

A person using the apparatus or method of the present disclosure (user) can see the entirety of the displayed visual information with the text portion of the visual information translated into a language he/she can comprehend/understand. Such a user would act as an information recipient as described above. A feature of the present disclosure is that the translated text is displayed to the user in such a way as to render the original text non-viewable (or obscured from view) to the user. Making the original text non-viewable may have distinct advantages such as reducing visual clutter (e.g. text superimposed or overlapping other text or other visual information), information ambiguity (e.g. which text corresponds to which other visual information), or requisite size reduction (e.g. making visual information smaller in size to accommodate the addition of translated text). By making the original text non-viewable, the display area taken up by the original text may be used to display the translated text. This may have distinct advantages such as preserving visual information orientation or arrangement and preserving information provider intent. The dynamic nature of the dynamic translation display overlay allows for real-time updating of visual information and/or the new information which may not have been available for pre-translation. The dynamic translation overlay allows a single set of visual information (e.g. a slide-deck, presentation, etc.) to be communicated comprehensibly to many information recipients in a wide variety of languages simultaneously.

Referring now to the figures, FIG. 1 is a schematic view of an apparatus/electronic device, such as a client/user device (a first device 101) communicatively connected, via a network 151, to a second electronic device, such as a server (a second device 150), and a generating device 120, according to an embodiment of the present disclosure. Further, in an embodiment, additional client/user devices can be communicatively connected to both the first device 101 and the second device 150. A second client/user device (a third device 102) can be communicatively connected to the first device 101, the second device 150, and the generating device 120. As shown, a plurality of the client/user devices can be communicatively connected to, for example, an Nth user device 10n.

An application can be installed or accessible on the first device 101 for executing the methods described herein. The application can also be integrated into the operating system (OS) of the first device 101. The first device 101 can be any electronic device such as, but not limited to, a personal computer, a tablet pc, a smart-phone, a smart-watch, an integrated AR/VR (Augmented Reality/Virtual Reality) headwear with the necessary computing and computer vision components installed (e.g., a central processing unit (CPU), a graphics processing unit (GPU), integrated graphics on the CPU, etc.), a smart-television, an interactive screen, a smart projector or a projected platform, an IoT (Internet of things) device or the like.

Figure 8:
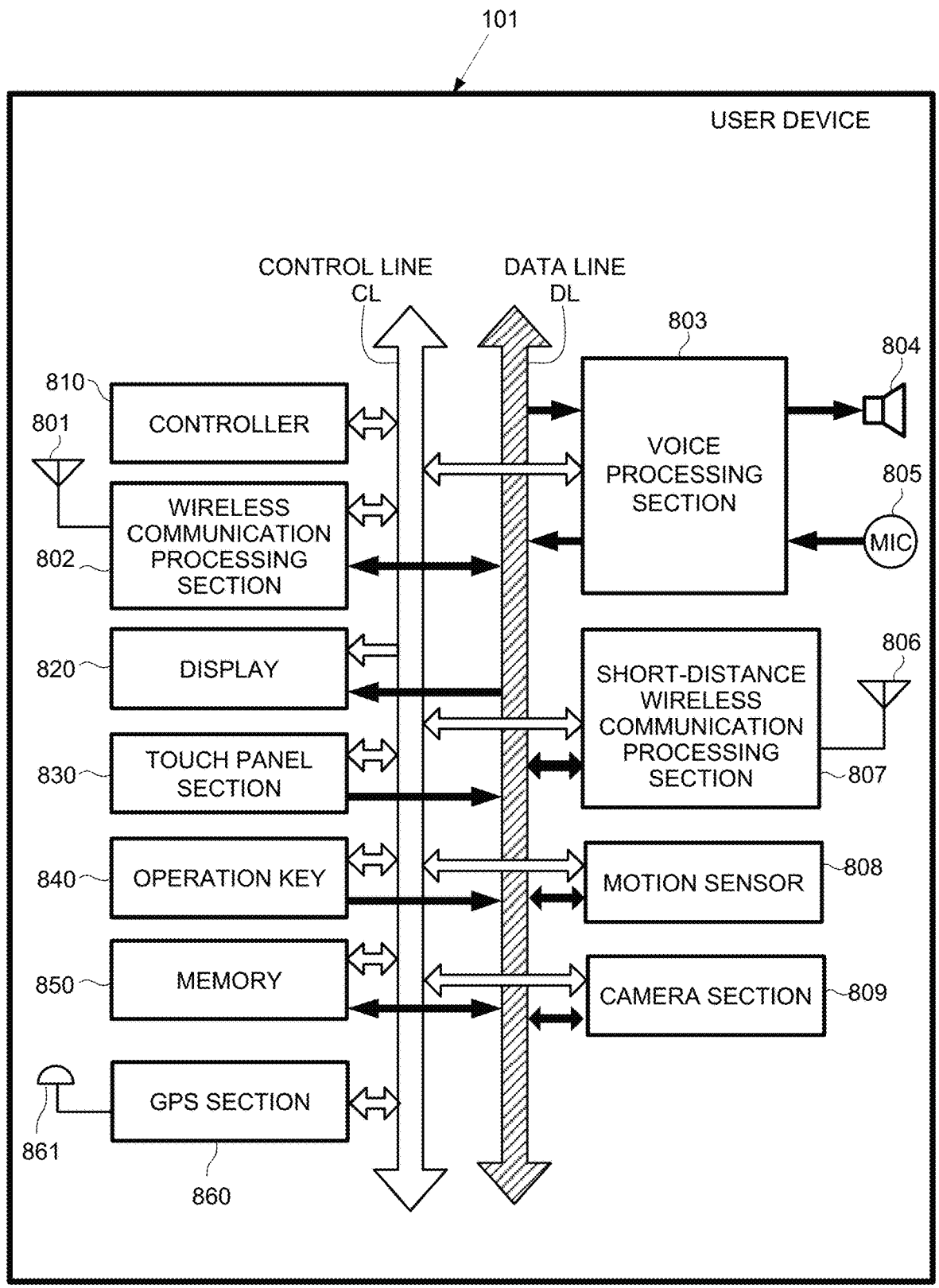
FIG. 8 is a schematic of a user device for performing a method, according to an exemplary embodiment of the present disclosure.
Figure 9:
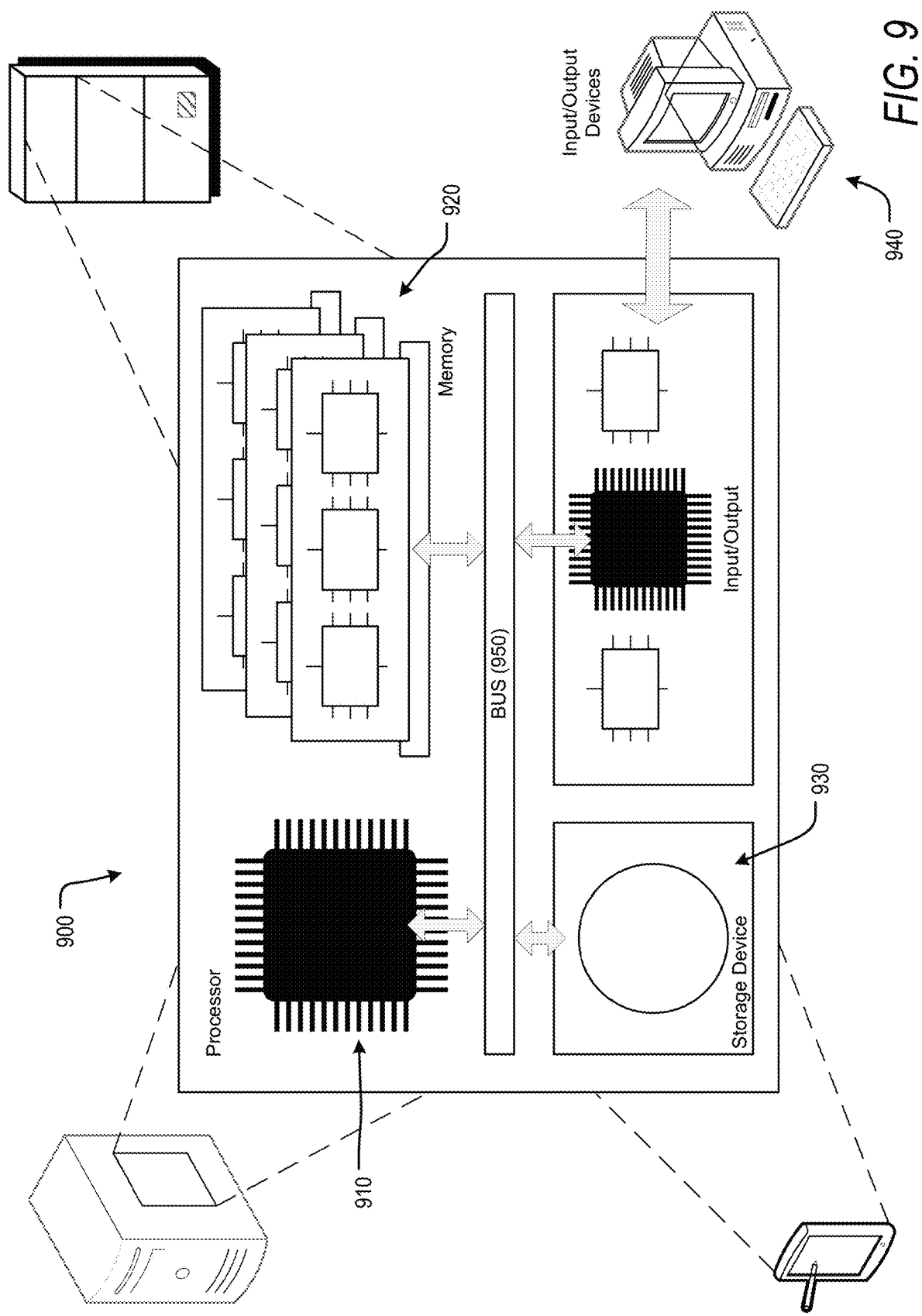
FIG. 9 is a schematic of a hardware system for performing a method, according to an exemplary embodiment of the present disclosure.
Figure 10:
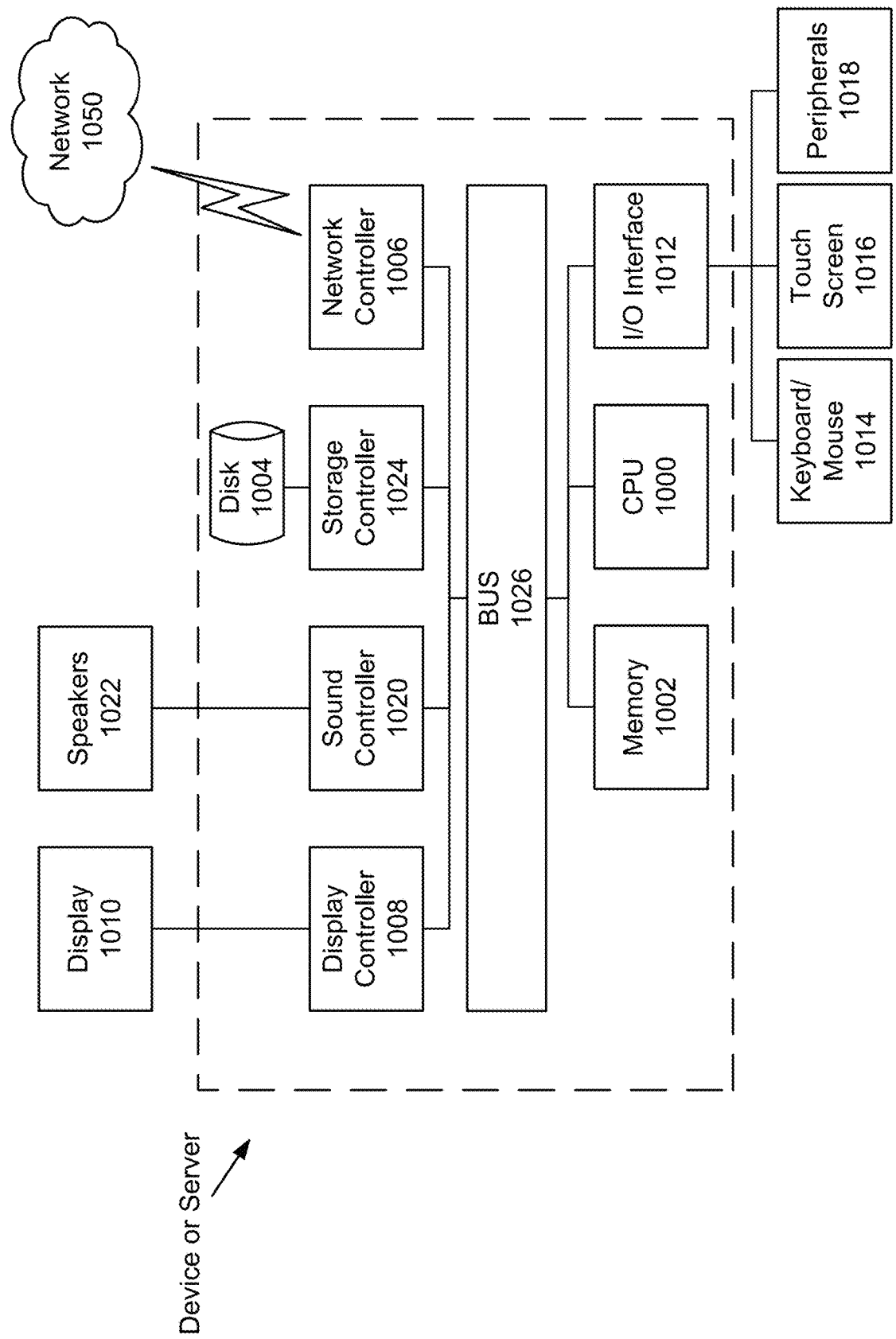
FIG. 10 is a schematic of a hardware configuration of a device for performing a method, according to an exemplary embodiment of the present disclosure.

As illustrated in FIG. 1, the first device 101 includes a CPU, a GPU, a main memory, and a frame buffer, among other components (discussed in more detail in FIGS. 8-10). In an embodiment, the first device 101 can call graphics that are displayed on a display. The graphics of the first device 101 can be processed by the GPU and rendered in scenes stored on the frame buffer that is coupled to the display. In an embodiment, the first device 101 can run software applications or programs that are displayed on a display. In order for the software applications to be executed by the CPU, they can be loaded into the main memory, which can be faster than a secondary storage, such as a hard disk drive or a solid state drive, in terms of access time. The main memory can be, for example, random access memory (RAM) and is physical memory that is the primary internal memory for the first device 101. The CPU can have an associated CPU memory and the GPU can have an associated video or GPU memory. The frame buffer may be an allocated area of the video memory. The GPU can display the displayed data pertaining to the software applications. It can be understood that the CPU may have multiple cores or may itself be one of multiple processing cores in the first device 101. The CPU can execute commands in a CPU programming language such as C++. The GPU can execute commands in a GPU programming language such as HLSL. The GPU may also include multiple cores that are specialized for graphic processing tasks. Although the above description was discussed with respect to the first device 101, it is to be understood that the same description applies to the other devices (101, 102, 10n, and 120) of FIG. 1. Although not illustrated in FIG. 1, the second device 150 can also include a CPU, GPU, main memory, and frame buffer.

Figure 2A:
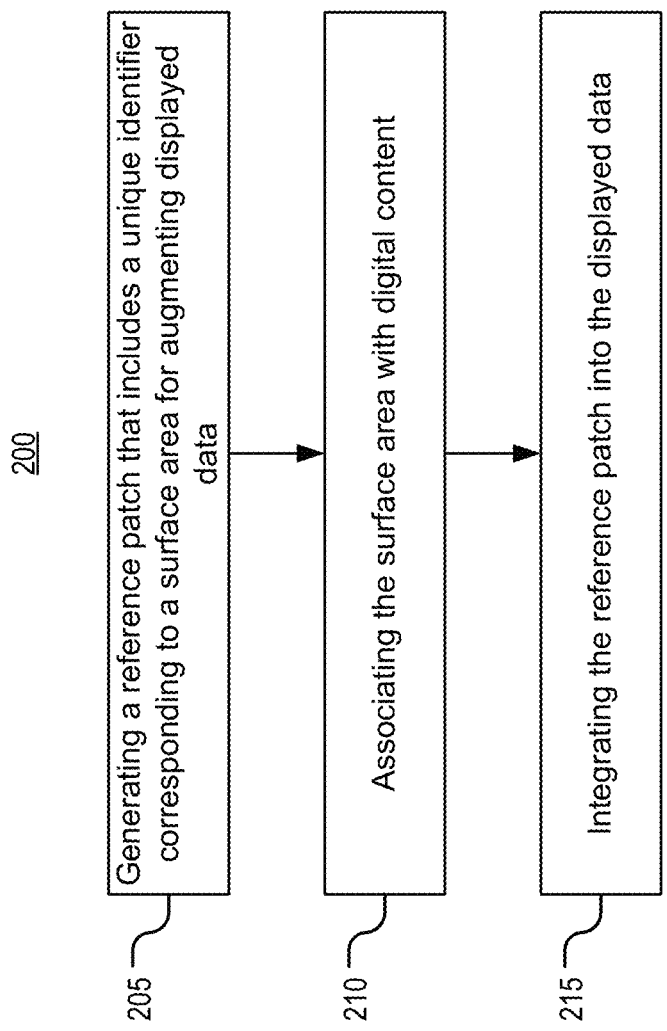
FIG. 2A is a flow chart for a method of generating a reference patch and embedding the reference patch into displayed data, according to an exemplary embodiment of the present disclosure.

FIG. 2A is a flow chart for a method 200 of generating a reference patch and embedding the reference patch into displayed data, according to an embodiment of the present disclosure. The present disclosure describes generation of the reference patch and embedding of this patch into the displayed data content in order to integrate additional content on the first device 101. In an embodiment, the first device 101 can incorporate digital content into what is already being displayed (displayed data) for a more immersive experience.

In this regard, the first device 101 can generate the reference patch in step 205. The reference patch can be an object having an area and shape that is embedded in the displayed data at a predetermined location in the displayed data. For example, the reference patch can be a square overlayed and disposed in a corner of a digital document (an example of displayed data), wherein the reference patch can be fixed to a predetermined page for a multi-page (or multi-slide) digital document. The reference patch can thus also represent a region of interest in the digital document. The reference patch can be an object that, when not in a field of view of the user, is inactive. The reference patch can, upon entering the field of view of the user, become active. For example, the reference patch can become active when detected by the first device 101 in the displayed data. When active, the reference patch can retrieve digital content and augment the displayed data by incorporating the retrieved digital content into the displayed data. Alternatively, the reference patch can become active when being initially located within the frame of the screen outputting the displayed data. For example, even if another window or popup is placed over top of the reference patch, the reference patch may continue to be active so long as the reference patch remains in the same location after detection and the window including the document incorporating the reference patch is not minimized or closed. As will be described further below, the reference patch can have a predetermined design that can be read by the first device 101, leading to the retrieval and displaying of the digital content.

In an embodiment, the first device 101 can use a geometrical shape for the reference patch for placement into any displayed data using applications executed in the first device 101. The reference patch can take any shape such as a circle, square, rectangle or any arbitrary shape. In step 210, the reference patch can also have predetermined areas within its shape for including predetermined data. The predetermined data can be, for example, unique identifiers that correspond to a surface area of the displayed data. The unique identifiers can be, for example, a marker. As will be described below, the marker can take the form of patterns, shapes, pixel arrangements, pixel luma, and pixel chroma, among others. The surface area, by way of the unique identifiers, can be associated with predetermined digital content that is recalled and displayed at the corresponding surface area in the displayed data. The unique identifier can include encoded data that identifies the digital content, a location address of the digital content at the second device 150 (see description below), a screen position within the surface area at which the digital content is insertable in the displayed data, and a size of the digital content when inserted in the displayed data (adjustable before being displayed).

That is, in an embodiment, the surface area (or an available area in which digital content is insertable/to be inserted) of the displayed data can be portion(s) of the displayed data that do not include objects that might obscure the reference patch or the digital content displayed at the corresponding surface area in the displayed data. For example, the first device 101 can use computer vision (described below) to detect the objects. For example, the first device 101 can inspect an array to determine locations of the objects. For example, a slide in a slide deck can include text, pictures, logos, and other media, and the surface area can be the blank space or spaces around the aforementioned objects. Thus, the digital content can be displayed somewhere in the blank spaces. In an embodiment, the surface area of the displayed data can include portions of the displayed data that already include objects and the digital content can be displayed at the same location as the objects. For example, a slide in a slide deck can include a picture of a user, and the reference patch can be the area representing a face of the user and the digital content can be displayed at the same location as a body of the user. For example, a slide in a slide deck can include an image of a vehicle and the reference patch can be disposed in a blank space of the displayed data, while the digital content retrieved (e.g., a new car paint color and new rims) can be displayed over the image of the vehicle. In other words, the digital content may be placed in a blank area of the displayed data and/or in an area that is not blank (i.e., an area that includes text, image(s), video(s), etc.).

In step 215, the first device 101 can embed the reference patch into the displayed data, such as a word processing document file (i.e., DOC/DOCX) provided by e.g., Microsoft® Word, in a Portable Document Format (PDF) file such as the ones used by Adobe Acrobat®, in a Microsoft® PowerPoint presentation (PPT/PPTX), or in a video sequence file such as MPEG, MOV, AVI or the like. These file formats are illustrative of some file types which a user may be familiar with; however, applications included in the first device 101 are not limited to these types and other applications and their associated file types are possible.

The reference patch (or similar element) can be embedded into any displayed data, where the displayed data may be generated by an application running on or being executed by the first device 101. The reference patch can encompass the whole area designated by the displayed data, or just a portion of the area designated by the displayed data. The method of generating the reference patch and embedding the reference patch into the displayed data has been described as being performed by the first device 101, however, the second device 150 can instead perform the same functions. In order to be detected in the displayed data on the first device 101, the reference patch may only be simply displayed as an image on the screen. The reference patch may also simply be a raster image or in the background of an image. The reference patch is also able to be read even when the image containing the reference patch is low resolution. Because the reference patch is encoded in a hardy and enduring manner such that even if a portion of the reference patch is corrupted or undecipherable, the reference patch can still be activated and used.

In an embodiment, the reference patch can be embedded inside of a body of an email correspondence. The user can use any electronic mail application such as Microsoft Outlook®, Gmail®, Yahoo®, etcetera. As the application is running on the first device 101, it allows the user to interact with other applications. In an embodiment, the reference patch can be embedded on a video streaming or two-way communication interface such as a Skype® video call or a Zoom® video call, among others. In an embodiment, the reference patch can be embedded in displayed data for multi-party communication on a live streaming interface such as Twitch®.

One way in which the first device 101 may embed the reference patch into the displayed data is by arranging the generated reference patch in the displayed data such as in a desired document or other media. The reference patch may include a facade of the digital content which becomes an integrated part of the displayed data. The facade can act as a visual preview to inform the user of the digital content linked to the reference patch. The facade can include, for example, a screenshot of a video to be played, a logo, an animation, or an image thumbnail, among others. The facade can be a design overlay. The design overlay can be a picture that represents the underlying digital content superimposed over the reference patch. In an embodiment, the facade can indicate the content that is represented by the reference patch. The facade can be contained within the shape of the reference patch or have a dynamic size. For example, attention of the user can be brought to the facade by adjusting the size of the facade when the reference patch is displayed on the display. The adjustment of the size of the facade can also be dynamic, wherein the facade can enlarge and shrink multiple times. By the same token, a position and rotation of the facade can also be adjusted to produce a shaking or spinning effect, for instance.

Unlike traditional means of sending displayed data, the first device 101 may not send the whole digital content with a header file (metadata) and a payload (data). Instead, the reference patch that may include a facade of the underlying digital content is placed within the displayed data. If a facade is used, it indicates to the first device 101 that the surface area can have digital content that can be accessed with selection (clicking with a mouse, touchpad, eye-gaze, eye-blinks, or via voice-command) of the facade. The digital content can also be accessed or activated automatically, e.g., when the user has the reference patch displayed on the display of the first device 101. Other symbolic means of visualization can be employed to indicate to the user that the surface area is likely to include information for obtaining digital content. For example, a highlighting effect can be applied along a perimeter of the reference patch in a pulsating pattern of highlighting intensity to bring attention to the presence of the reference patch. For example, a series of spaced dashes surrounding the reference patch and oriented perpendicular to the perimeter of the reference patch can appear and disappear to provide a flashing effect. Other means can be employed to indicate to the user that the surface area is likely to include information for obtaining digital content, such as an audio cue.

The first device 101 employs further processes before embedding the reference patch into the displayed data. These processes and schemas are further discussed in FIG. 2B.

Figure 2B:
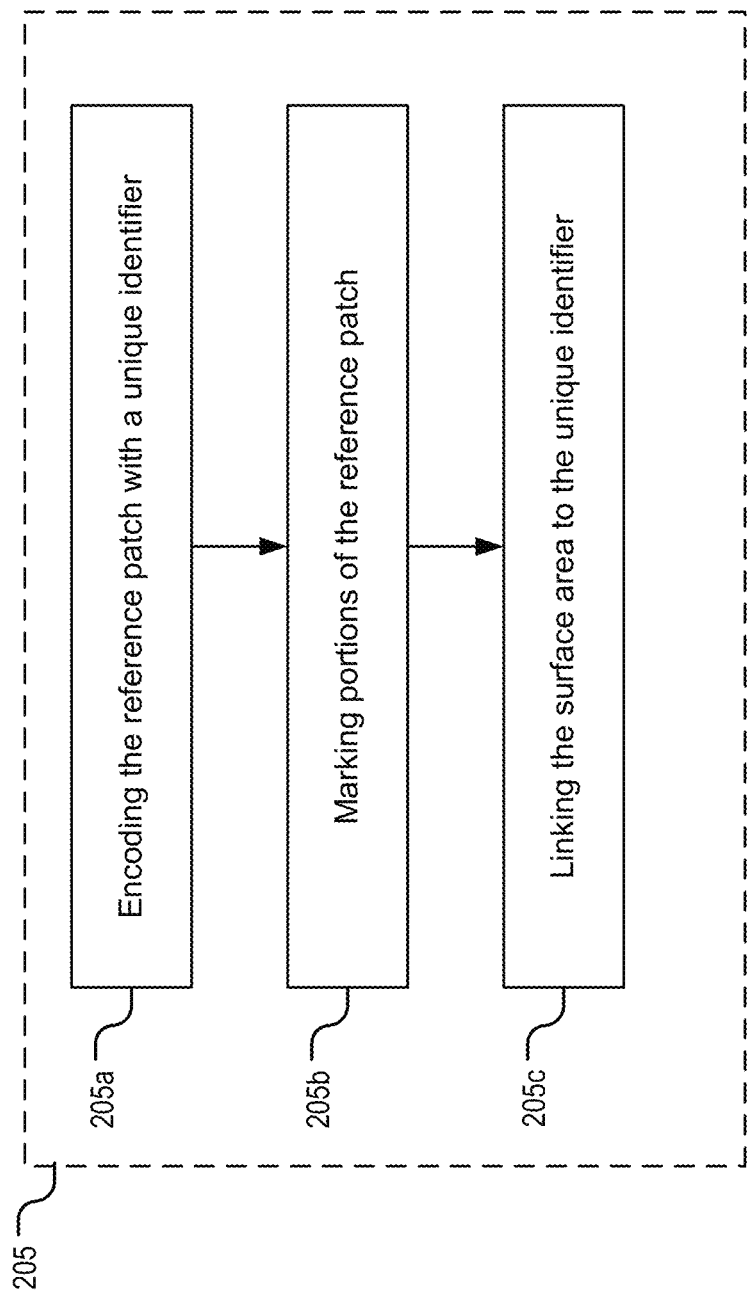
FIG. 2B is a flow chart of a sub-method of generating the reference patch, according to an exemplary embodiment of the present disclosure.

FIG. 2B is a flow chart of a sub-method of generating the reference patch, according to an embodiment of the present disclosure. The first device 101 can associate the digital content with the surface area corresponding to the reference patch (e.g., via the unique identifiers included therein) generated by the first device 101. In an embodiment, the surface area may encompass the whole of the displayed data or a portion of it.

The reference patch, which includes the unique identifiers corresponding to the surface area associated with the digital content, is then embedded into the displayed data by the first device 101. In some use cases, the displayed data including the reference patch can be sent or transmitted to a second user having the third device 102 including the same application, which then allows the second user to access information within the surface area and obtain the digital content and have it viewable on the third device 102. That is, the third device 102 can have the same displayed data overlaid with the augmenting digital content on the surface area of the display of the third device 102 in the location or locations defined by the reference patch.

In FIG. 2B, the generating device 120 uses additional processes to effectuate generation of the reference patch which is obtained and embedded by the first device 101. In an embodiment, the generating device 120 encodes the reference patch with the unique identifiers corresponding to the surface area in step 205*a*. The generating device 120 can mark areas of the reference patch in step 205*b* to form the marker that, either separately or in combination, define or may be used to access the unique identifiers. The marker can take the form of patterns, shapes, pixel arrangements, or the like. In an example, the marker can have a shape that corresponds to the shape of the surface area. In an example, the marker can have a size that corresponds to the size of the surface area. In an example, the marker can have a perimeter that corresponds to the perimeter of the surface area. The marker can use any feasible schema to provide identifying information that corresponds to the surface area within parts of the displayed data. In an embodiment, the marker can incorporate hidden watermarks that are only detectable by the first device 101 and the third device 102, which have detection functionality implemented therein, for example having the application installed or the functionality built into the operating system.

The marker can incorporate patterns which can then be extracted by the first device 101. In an example, the first device 101 can perform the embedding, then send the digital content having the embedded reference patch to the third device 102. The encoding is performed by the generating device 120 and may use any variety of encoding technologies such as the ARUCO algorithm to encode the reference patch by marking the reference patch with the marker. The first device 101 may also be used as the generating device 120.

In an embodiment, the marker can be comprised of a set of points, equidistant from each other and/or some angle apart from a reference point, such as the center of the reference patch or represent some other fiducial points. That is, the fiducial points corresponding to the marker can provide a set of fixed coordinates or landmarks within the digital content with which the surface area can be mapped relative to the fiducial points. In an embodiment, the marker can be comprised of a set of unique shapes, wherein predetermined combinations of the unique shapes can correspond to a target surface area (or available area, or areas) for displaying the displayed data. The predetermined combinations of the unique shapes can also correspond to predetermined digital content for displaying in the surface area. The predetermined combinations of the unique shapes can also correspond to/indicate a position/location where the digital content should be displayed at the surface area relative to a portion of the surface area. A combination of the set of points and unique identifiers can be used as well.

For example, the unique identifiers can be unique shapes that correlate to predetermined digital content as well as indicating where the digital content should be overlayed on the display (the screen position) relative to a set of points marked on the reference patch. The unique identifiers can also indicate a size of the digital content to be overlayed on the display, which can be adjustable based on the size of the surface area (also adjustable) and/or the size of the display of the first device 101. The unique identifiers can be relatively invisible or undetectable to the user, but readable by the first device 101 and cover predetermined areas of the reference patch. The unique identifiers, and by extension, the marker, can have an appearance that is marginally different from an appearance of the area of the reference patch. For example, the area of the reference patch can appear white to the user and the unique identifiers can also appear white to the user but may actually have a slightly darker pixel color that can be detected and interpreted by a device, such as the first device 101. For instance, the appearance of the unique identifiers can be 0.75% darker than the white color of the area of the reference patch. Such a small difference can be identified and discerned by the first device 101 while being substantially imperceptible to the user.

In an embodiment, the area of the reference patch can be divided into predetermined shapes, for instance a set of squares, and within each square, the marker (such as a "letter") can be included. For example, there can be 16 squares. Furthermore, subsets of the set of squares can be designated to represent varying information, such as a timestamp corresponding to 8 of the squares, a domain corresponding to 5 of the squares, a version corresponding to 1 of the squares, and additional information corresponding to a remainder of the squares. An identification based on the set of squares can be, for example, an 18-character (or "letter") hexadecimal. The set of squares can further include additional subsets for a randomization factor, which can be used for calculating a sha256 hash prior to encoding the reference patch with the hash. Together, the set of squares having the marker included therein can comprise the unique identifiers.

Moreover, the generating device 120 can also employ chroma subsampling to mark attributes represented by a particular pattern. In an embodiment, the generating device 120 can mark parts of the reference patch with predetermined patterns of pixel luma and chroma manipulation that represent a shape, a size, or a position of the surface area for displaying the digital content. Moreover, the generating device 120 can mark a perimeter of the reference patch with a predetermined edging pattern of pixel luma and chroma manipulation that represents a perimeter of the surface area for displaying the digital content.

The generating device 120 can further link the surface area with unique identifiers in step 205c. The unique identifiers can be hashed values (such as those described above) that are generated by the generating device 120 when the reference patch is generated (such as the one having the area of the reference patch divided into the subset of squares).

Figure 2C:
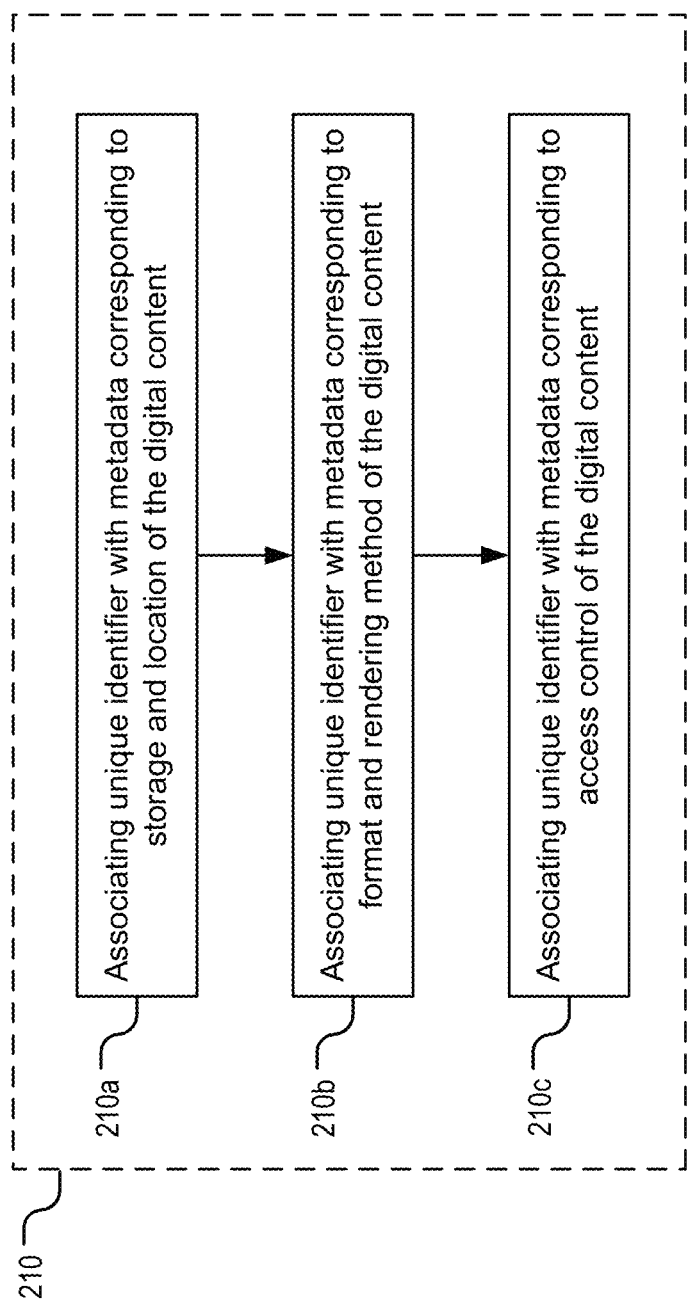
FIG. 2C is a flow chart of a sub-method of associating the surface area with digital content, according to an exemplary embodiment of the present disclosure.

FIG. 2C is a flow chart of a sub-method of associating the surface area with digital content, according to an embodiment of the present disclosure. In FIG. 2C, the generating device 120 uses additional processes to associate the surface area with digital content. In an embodiment, the generating device 120 can associate the unique identifiers corresponding to the surface area with metadata. In step 210a, the unique identifiers can be associated with metadata embodying information about the storage and location of the digital content. Moreover, in step 210b, the generating device 120 can associate the unique identifier of the surface area with metadata which embodies information about the format and rendering information used for the digital content. In step 210c, the generating device 120 can associate the unique identifiers of the surface area with metadata which embodies access control information of the digital content.

In an embodiment, the storage of the digital content can be on a remote server, such as the second device 150, and the location of the digital content can be the location address of the memory upon which it is stored at the remote server. The storage and location of the digital content are thus linked with the metadata that can point to where the digital content can later be obtained from. The digital content is not embedded into the displayed data. In an embodiment, the format and rendering information about the digital content is embodied in the metadata and associated with the unique identifiers. This information is helpful when the first device 101 or the third device 102 are on the receiving end of the transmitted displayed data and need to properly retrieve and process the digital content.

Moreover, in an embodiment, the access control of the digital content can also be encompassed in the metadata and associated with the unique identifiers corresponding to the surface area. The access control can be information defining whether the digital content can be accessed by certain individuals or within a certain geographical location. The access control information can define restrictions such as those placed upon time and date as to when and how long the digital content can be accessed. The access control information can define the type of display reserved for access by the first device 101. For example, a user may wish to restrict access to the digital content to certain types of devices, such as smartphone or tablets. Thus, the metadata defining a display requirement would encompass such an access control parameter.

Figure 2D:
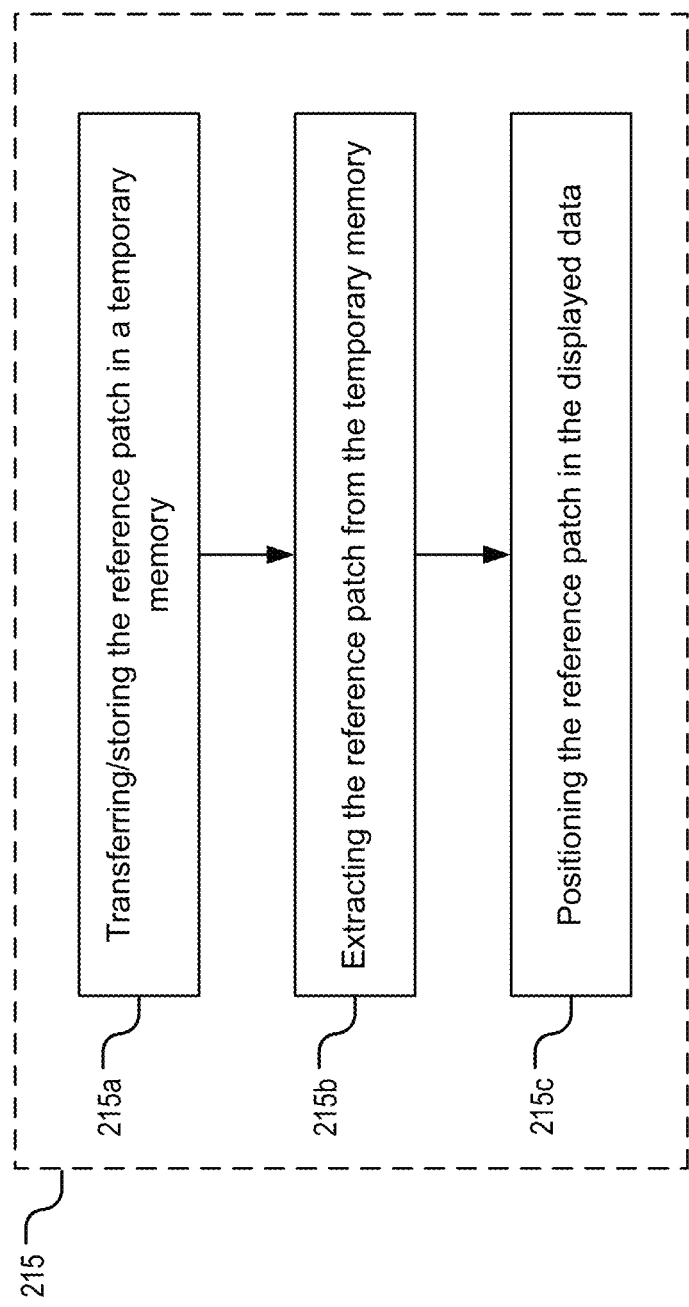
FIG. 2D is a flow chart of a sub-method of integrating the reference patch into the displayed data, according to an exemplary embodiment of the present disclosure.

FIG. 2D is a flow chart of a sub-method of integrating the reference patch into the displayed data, according to an embodiment of the present disclosure. In FIG. 2D, the generating device 120 uses additional processes to effectuate integration of the reference patch into the displayed data. In an embodiment, the first device 101 can temporarily transfer or store the reference patch in a storage of the first device 101 in step 215a. The storage can be accessed by the first device 101 for embedding the reference patch into the displayed data at any time. The first device 101 can extract the reference patch from the storage for embedding purposes in step 215b. The first device 101 can also arrange the reference patch at a predetermined location and with a predetermined reference patch size in step 215c. The first device 101 can further embed the reference patch such that a document, for example, having the reference patch embedded therein can be sent to a recipient, for example the second user using the third device 102, where he/she can access the document using the application on the third device 102 as further described below. Again, the features of the generating device 120 can be performed by the first device 101.

The displayed data can be output from a streaming application or a communication application with a data stream having the reference patch embedded therein. The actual digital content may not be sent along with the underlying displayed data or data stream, but only the unique identifier and/or a facade of the digital content is sent. The unique identifier and/or the underlying metadata can be stored in a cloud-based database such as MySQL which can point to the second device 150 or a cloud-based file hosting platform that ultimately houses the digital content. No limitation is to be taken with the order of the operation discussed herein; such that the sub-methods performed by the first device 101 can be carried out synchronous to one another, asynchronous, dependently or independently of one another, or in any combination. These stages can also be carried out in serial or in parallel fashion.

Figure 3A:
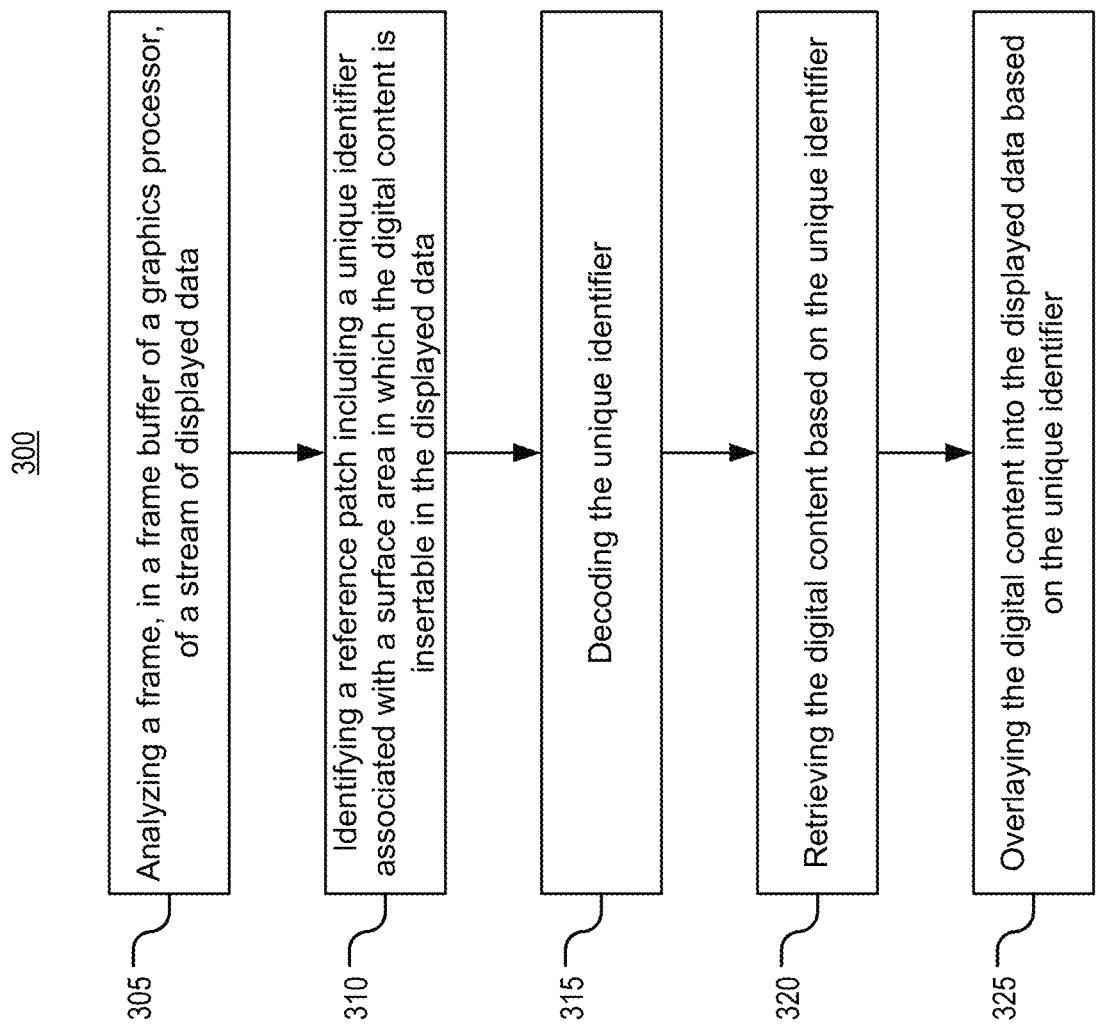
FIG. 3A is a flow chart for a method of inspecting the reference patch, according to an exemplary embodiment of the present disclosure.

FIG. 3A is a flow chart for a method 300 of identifying the reference patch included in the displayed data and overlaying the digital content into displayed data, according to an embodiment of the present disclosure. In an embodiment, in step 305, the first device 101 can inspect the stream of data being outputted by the first device's 101 video or graphics card and onto the display of the first device 101. That is, the first device 101 can access a frame buffer of the GPU and analyze, frame by frame, in the frame buffer, the outputted stream of data which can include the displayed data. In an embodiment, a frame represents a section of the stream of the displayed data that is being displayed by the first device 101. In that regard, the first device 101 can inspect the outputted stream of data. The first device 101 can achieve this by intercepting and capturing data produced from the first device 101's video card or GPU that is communicated to the first device 101's display.

In an embodiment, in step 310, the first device 101 can process attributes of each pixel included in a single frame and detect groups of pixels within that frame, which may have a known predetermined pattern of pixel luma and chroma manipulation, in order to find the reference patch.

The inspected frame by frame stream of data is also used by the first device 101 to identify the reference patch which includes the unique identifiers therein. In an embodiment, the first device 101 employs pattern recognition algorithms to detect and identify the reference patch, the perimeter of the reference patch, and/or the area of the reference patch. In an embodiment, the first device 101 detects and identifies the reference patch via the marker itself. A variety of pattern recognition algorithms can be used, such as Artificial Neural Networks (ANN), Generative Adversarial Networks (GAN), thresholding, SVM (Support Vector Machines) or any classification and pattern recognition algorithm available conducive to computer vision. Computer vision techniques may be artificial intelligence techniques that train computers to interpret and understand a visual world. In an example, the computer vision techniques may be an image recognition task, a semantic segmentation task, and the like. In a non-limiting example, the processor-based computer vision operation can include sequences of filtering operations, with each sequential filtering stage acting upon the output of the previous filtering stage. For instance, when the processor (processing circuitry) is/includes a GPU, these filtering operations are carried out by fragment programs.

In another example, the computer vision techniques may be a processor-based computer vision technique. In an embodiment, the first device 101 can look for predetermined or repeatable patterns within the frame which indicates the presence of the reference patch. In an embodiment, the first device 101 can identify the reference patch based on a confidence level, the confidence level being high when the predetermined pattern of pixel luma and chroma manipulation and the predetermined edging pattern of pixel luma and chroma manipulation are detected in the reference patch. The confidence level can be lower when one or neither of the predetermined patterns is/are detected.

According to an embodiment, in the event that an input to the operation is an image, the input images can be initialized as textures and then mapped onto quadrilaterals. By displaying these quadrilaterals in appropriately sized windows, a one-to-one correspondence of image pixels to output fragments can be ensured. Similarly, when the input to the operation is an encoded image, a decoding process may be integrated into the processing steps described above. A complete computer vision algorithm can be created by implementing sequences of these filtering operations. After the texture has been filtered by the fragment program, the resulting image is placed into texture memory, either by using render-to-texture extensions or by copying the frame buffer into texture memory. In this way, the output image becomes the input texture to the next fragment program. This creates a pipeline that facilitates the entire computer vision algorithm. However, often a complete vision algorithm may require operations beyond filtering. For example, summations are common operations. Furthermore, more-generalized calculations, such as feature tracking, can also be mapped effectively onto graphics hardware.

In an embodiment, the reference patch can be identified by use of edge detection methods. In particular, edge detection can be used for the perimeter of the reference patch having a predetermined pattern (the predetermined edging pattern). In an example, the edge detection method may be a Canny edge detector. The Canny edge detector may run on the GPU. In one instance, the Canny edge detector can be implemented as a series of fragment programs, each performing a step of the algorithm.

In an embodiment, the identified reference patch can be tracked from frame to frame using feature vectors. Calculating feature vectors at detected feature points is an operation in computer vision. A feature in an image is a local area around a point with some higher-than-average amount of uniqueness. This makes the point easier to recognize in subsequent frames of video. The uniqueness of the point is characterized by computing a feature vector for each feature point. Feature vectors can be used to recognize the same point in different images and can be extended to more generalized object recognition techniques.

Feature detection can be achieved using methods similar to the Canny edge detector that instead search for corners rather than lines. If the feature points are being detected using sequences of filtering, the GPU can perform the filtering and read back to the CPU a buffer that flags which pixels are feature points. The CPU can then quickly scan the buffer to locate each of the feature points, creating a list of image locations at which feature vectors on the GPU will be calculated.

In step 315, the first device 101 can decode the encoded data of the unique identifiers from the area of the reference patch, wherein the unique identifiers correspond to the surface area. The unique identifiers can be hashed values that could have been generated beforehand by the first device 101.

In step 320, the first device 101 can use the unique identifiers to link the surface area with the digital content using metadata and retrieve the digital content based on the unique identifiers.

In step 325, the first device 101 can overlay the digital content onto the surface area of the displayed data based on the unique identifiers.

Again, the method of identifying the reference patch included in the displayed data and augmenting the displayed data is described as performed by the first device 101, however, the second device 150 can instead perform the same functions.

Figure 3B:
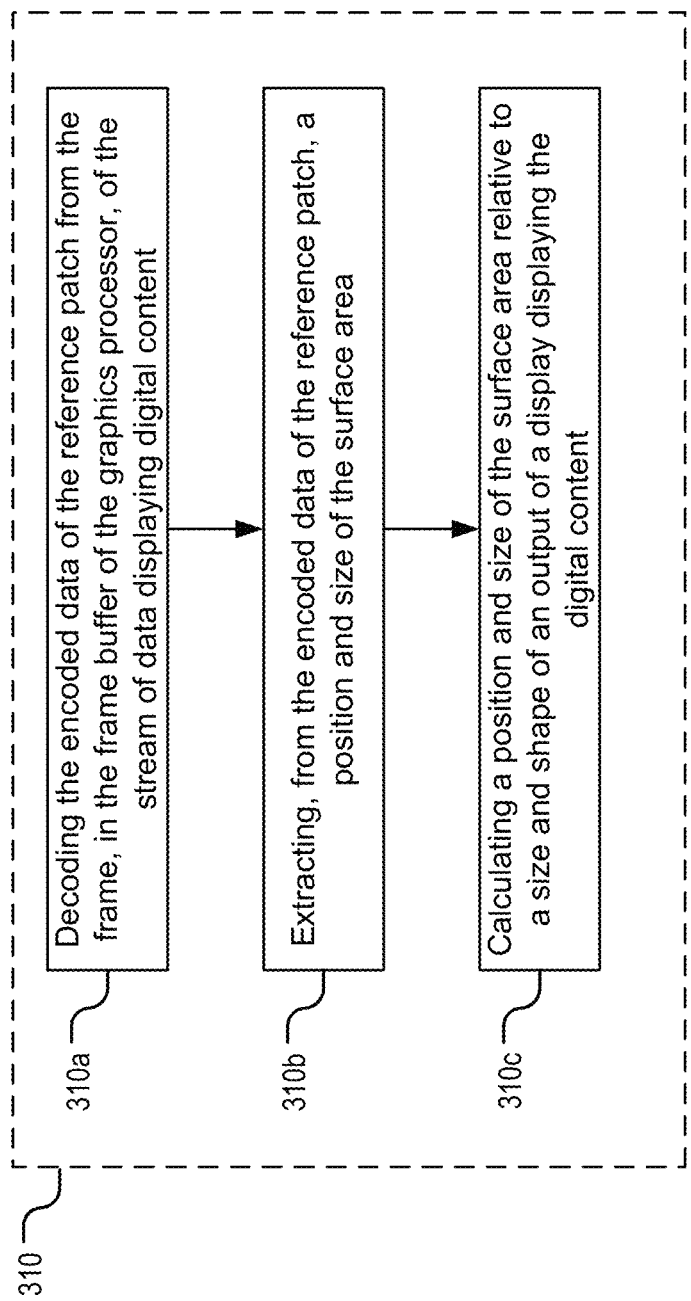
FIG. 3B is a flow chart of a sub-method of identifying the reference patch with unique identifiers corresponding to the surface area from the stream of data, according to an exemplary embodiment of the present disclosure.

In an embodiment, the first device 101 identifies the surface area corresponding to the reference patch by employing further processes to process the frames. To this end, FIG. 3B is a flow chart of a sub-method of identifying the reference patch with the unique identifiers corresponding to the surface area from the stream of data, according to an embodiment of the present disclosure.

In step 310a, the first device 101 can decode the encoded reference patch from the frame. The encoded reference patch can include the marker that makes up the unique identifiers within the reference patch incorporated previously. The reference patch can also include other identifying information. The marker can be disposed within the reference patch, such as within the area of the reference patch or along a perimeter of the reference patch, or alternatively, outside of the area of the reference patch.

Whatever schema is used to encode the marker in the reference patch is also used in reverse operation to decode the underlying information contained within the reference patch. As stated above, in an embodiment, the encoded marker can be patterns generated and decoded using the ARUCO algorithm or by other algorithms that encode data according to a predetermined approach.

In step 310b, the first device 101 can also extract attributes of the surface area from the reference patch. In an embodiment, the position, size, shape, and perimeter of the surface area are extracted, although other parameters can be extracted as well. Other parameters include boundary lines, area, angle, depth of field, distance, ratio of pairs of points, or the like. In an embodiment, where shape and perimeter are designated as the attributes, the first device 101 makes determinations of size, shape, and perimeter and outputs that result. Specifically, the size or shape of the surface area can be determined by evaluating a predetermined or repeatable pattern of pixel luma and chroma manipulation in the reference patch. The predetermined pattern can be marked on, within the area, or outside of the area of the reference patch. The predetermined pattern can correspond to the size or shape of the surface area. The predetermined pattern can correspond to the size or shape of the digital content. The perimeter of the surface area can also be determined by evaluating a predetermined edging pattern of pixel luma and chroma manipulation. The predetermined edging pattern can be marked on, within the area, or outside of the area of the reference patch. That is, the predetermined edging pattern of the reference patch can correspond to the perimeter of the surface area. The predetermined edging pattern of the reference patch can correspond to the perimeter of the digital content.

In step 310c, the first device 101 can also calculate a position and size of the surface area relative to the size and shape (dimensions) of the output signal from the display that is displaying the displayed data. In an embodiment, the calculating of the size, relative to the size and shape of the outputted signal from the display, includes determining the size of the surface area by inspecting a furthest measured distance between the edges of the surface area. Furthermore, the calculating of a location of the surface area, relative to the size and shape of the outputted signal from the display, includes determining the location of the surface area relative to the size and shape of the displayed data outputted through the display. This includes calculating the distance between the outer edges of the surface area and the inner edges of the displayed data being outputted by the display. The determined size and location of the surface area can be outputted as a result. Notably, prior to overlaying the digital content into the displayed data, the first device 101 can adjust, based on the predetermined pattern and the predetermined edging pattern, the size and perimeter of the digital content for displaying in the display of the first device 101. For example, the size and perimeter of the digital content for displaying in the display of the first device 101 can be scaled based on the size and perimeter of the surface area and/or the size of the display.

The first device 101 can provide information regarding the characteristics of the output video signal, such that the digital content that is later overlaid can correctly be displayed to account for various manipulations or transformations that may take place due to hardware constraints, user interaction, image degradation, or application intervention. Such manipulations and transformations may be the relocation, resizing, and scaling of the reference patch and/or the surface area, although the manipulations and transformations are not limited to those enumerated herein.

In an embodiment, the reference patch itself can be used as the reference for which the digital content is displayed on the surface area. In one example, the location at which to display the digital content in the surface area can be determined relative to the location of the reference patch on the displayed data. In one example, the size of the surface area can be determined relative to the size of the reference patch on the displayed data. In an example employing a combination of the two properties of the reference patch, the reference patch displayed in the displayed data on a smart phone having a predetermined size and a surface area can be scaled relative to the predetermined size of the display of the smart phone. This can be further adjusted when the reference patch in the same displayed data is displayed on a desktop monitor, such that the predetermined size of the reference patch in the displayed data displayed on the desktop monitor is larger and thus the size of the surface area can be scaled to be larger as well. Furthermore, the location of the surface area can be determined via a function of the predetermined size of the reference patch. For example, the location at which to display the digital content in the surface area can be disposed some multiple widths laterally away from the location of the reference patch as well as some multiple heights longitudinally away from the location of the reference patch. As such, the predetermined size of the reference patch can be a function of the size of the display of the first device 101. For example, the predetermined size of the reference patch can be a percentage of the width and height of the display, and thus the location and the size of the surface area are also a function of the width and height of the display of the first device 101.

In an embodiment, the first device 101 can determine an alternative location at which to display the digital content based on behaviors of the user. For example, the first device 101 can compare the encoded data corresponding to the location at which to display the digital content in the surface area to training data describing movement and focus of the user's eyes while viewing the displayed data. Upon determining the location at which to display the digital content in the surface area (as encoded in the reference patch) is not the same as the training data, the first device 101 can instead display the digital content at the location described by the training data as being where the user's eyes are focused in the displayed data at a particular time. For example, the user's eyes may be predisposed to viewing a bottom-right of a slide in a slide deck. The first device 101 can decode the reference patch and determine the digital content is to be displayed in a bottom-left of the slide deck. The training data can indicate that, for example, the user's eyes only focus on the bottom-left of the slide 10% of the time, while user's eyes focus on the bottom-right of the slide 75% of the time. Thus, the first device 101 can then display the digital content in the bottom-right of the slide instead of the bottom-left. The training data can also be based on more than one user, such as a test population viewing a draft of the slide deck. For example, the training data can be based on multiple presentations of the slide deck given to multiple audiences, wherein eye tracking software determines the average location of the audience's focus on each of the slides.

Figure 3C:
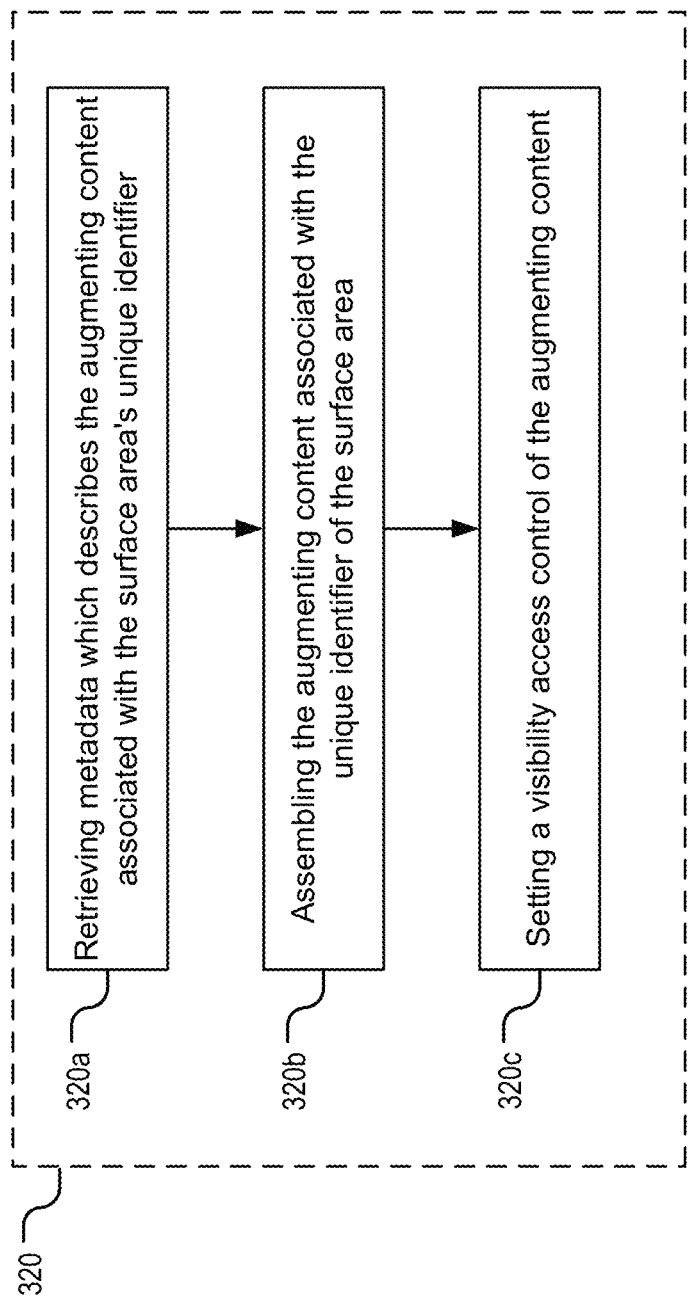
FIG. 3C is a flow chart of a sub-method of associating the unique identifiers with digital content, according to an exemplary embodiment of the present disclosure.

In an embodiment, the first device 101 employs other processes to associate the unique identifiers with the digital content. To this end, FIG. 3C is a flow chart of a sub-method of associating the unique identifiers with digital content, according to an embodiment of the present disclosure. In step 320a, the first device 101 can send the unique identifiers to the second device 150 and the second device 150 can retrieve metadata that describes the digital content, the digital content being associated with the surface area through the unique identifiers. This can be done by querying a remote location, such as a database or a repository, using the unique identifiers of the surface area as the query key. In an embodiment, the first device 101 sends the unique identifiers to the second device 150 and the second device 150 associates the unique identifier of the reference patch to corresponding digital content based on the metadata. The metadata associated with the surface area's unique identifier can be transmitted to the first device 101 with the augmentation content.

In step 320b, the first device 101 can assemble the digital content that is associated with the surface area's unique identifier. The assembly can entail loading the necessary assets for assembling the digital content. In an embodiment, this can entail loading manipulation software or drivers in order to enable the first device 101 to process the digital content. Other assembling processes can be the loading of rendering information in order to transform and manipulate an individual portion of the digital content. Furthermore, the loaded manipulation software, drivers, or rendering information can be used to compile all the individual portions of the entire digital content together. In an embodiment, this can include adapting the file formats of the digital content, delaying the playback for the digital content, converting from one format to another, scaling the resolution up or down, converting the color space, etc.

In step 320c, the first device 101 can provide access control parameters for the digital content. The access control parameters can dictate whether the digital content is visible to some users, or to some geographical locations, or to some types of displays and not others, as well as the date and time or duration of time a user can access the digital content or is allowed to access. In an embodiment, visibility of the digital content can be defined for an individual. For example, the digital content can be a video that is appropriate for users over a certain age. In an embodiment, visibility of the digital content can be defined for a geographic location. For example, the digital content can be a video that is region-locked based on a location of the first device 101. In an embodiment, visibility of the digital content can be defined for a type of display displaying the displayed data. For example, the digital content can be VR-based and will only display with a VR headset. In an embodiment, visibility of the digital content can be defined for a predetermined date and a predetermined time. For example, the digital content can be a video that will only be made publicly available after a predetermined date and a predetermined time. In an embodiment, visibility of the digital content can be defined for a time period. For example, the digital content can be a video that is only available for viewing during a holiday. The first device 101 thus calculates the user's access level based on those parameters and provides an output result as to the user's ability to access the digital content, i.e., whether the digital content will be visible or invisible to the user. Note that the access control parameters can be global, for all the displayed data, or it can be localized per surface area and the underlying digital content.

Referring again to FIG. 3A, in step 325, the first device 101 can carry on the processes of overlaying the surface area with the digital content into the displayed data in accordance with the surface area, the position, and the size identified by the unique identifier. The first device 101 can determine or adjust the size and location of the assembled digital content on the surface area relative to the size and shape of the displayed data being outputted by the display. Then, the first device 101 can render the associated digital content (or the assembled individual portions) over the surface area's shape and perimeter using the size and location information. Thus, the digital content is superimposed on top of the surface area.

Figure 4A:
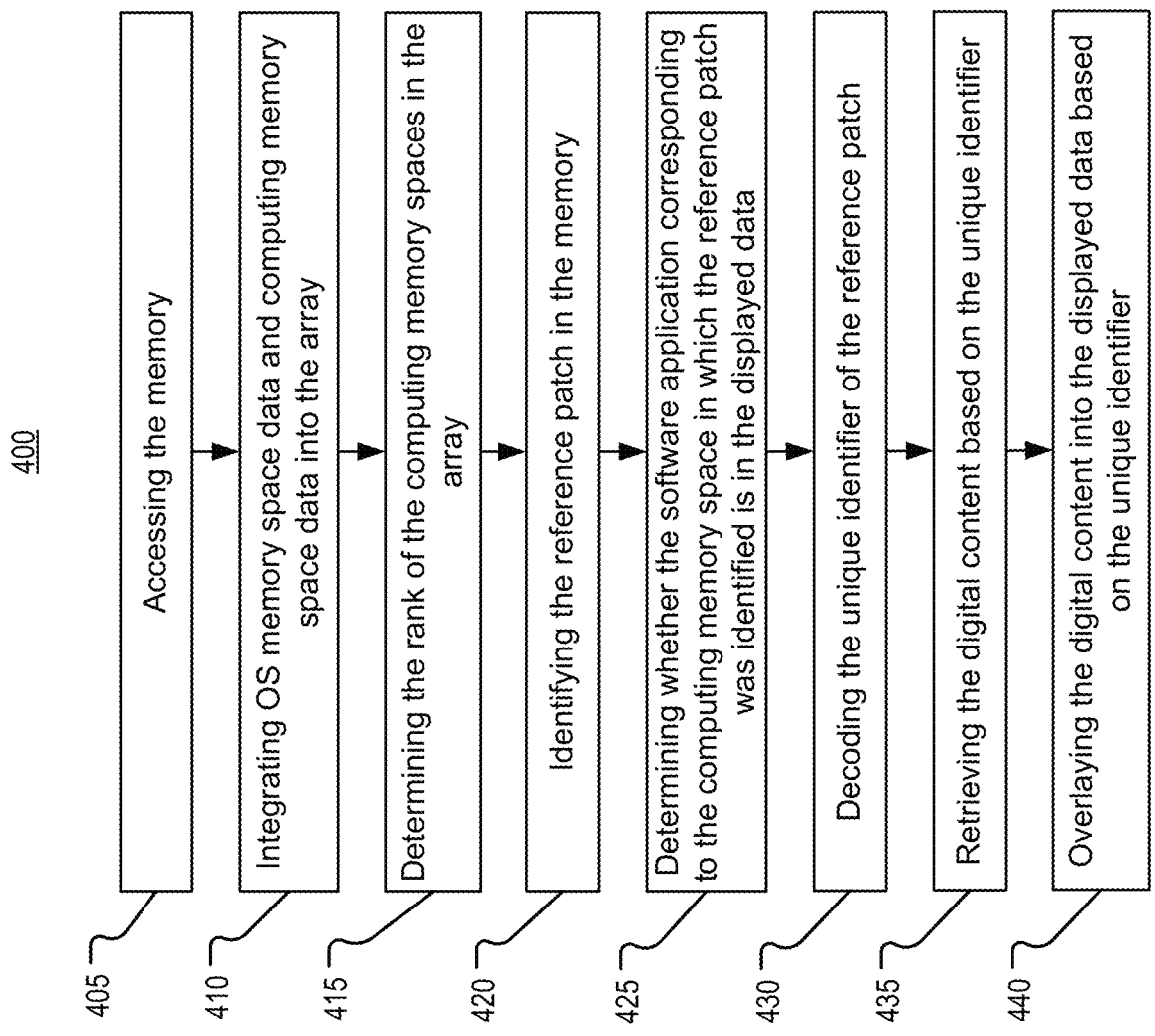
FIG. 4A is a flow chart for a method of identifying the reference patch included in the displayed data and overlaying the digital content into displayed data, according to an exemplary embodiment of the present disclosure.

FIG. 4A is a flow chart for a method 400 of identifying the reference patch included in the displayed data and overlaying the digital content into displayed data, according to an embodiment of the present disclosure. In an embodiment, in step 405, the first device 101 can inspect the main memory on the first device 101. Again, the main memory of the first device 101 refers to physical internal memory of the first device 101 where all the software applications are loaded for execution. Sometimes complete software applications can be loaded into the main memory, while other times a certain portion or routine of the software application can be loaded into the main memory only when it is called by the software application. The first device 101 can access the main memory of the first device 101 including an operating system (OS) memory space, a computing memory space, and an application sub-memory space for the computing memory space in order to determine, for example, which software applications are running (computing memory space), how many windows are open for each software application (application sub-memory space), and which windows are visible and where they are located (or their movement) on the display of the first device 101 (OS memory space). That is to say, the OS memory takes up a space in (or portion of) the main memory, the computing memory takes up a space in (or portion of) the main memory, and the application sub-memory takes up a space in (or portion of) the computer memory. This information can be stored, for example, in the respective memory spaces. Other information related to each software application can be obtained and stored and is not limited to the aforementioned features.

In an embodiment, in step 410, the first device 101 can aggregate the various memory spaces into an array (or table or handle). That is, the first device 101 can integrate data corresponding to the OS memory space and data corresponding to the computing memory space into the array. The array can be stored on the main memory of the first device 101 and include information regarding the software applications running on the first device 101. In an embodiment, the computing memory spaces (including the application sub-memory spaces) can be aggregated into the array. This can be achieved by querying the main memory for a list of computing memory spaces of all corresponding software applications governed by the OS and aggregating all the computing memory spaces obtained from the query into the array. This can be, for example, aggregating the computing memory space of a PowerPoint file and the computing memory space of a Word file into the array. The information in the computing memory spaces stored in the array can include metadata of the corresponding software application. For example, for PowerPoint, the information in the array can include a number of slides in a presentation, notes for each slide, etc. Moreover, each window within the PowerPoint file and/or the Word file can be allocated to a sub-memory space. For example, the array can include the location of each window for each software application running on the first device 101, which can be expressed as an x- and y-value pixel coordinate of a center of the window. For example, the array can include the size of each window for each software application running on the first device 101, which can be expressed as a height and a width value.

In an embodiment, in step 415, the first device 101 can determine a rank or a hierarchy of the computing memory spaces in the array. The rank can describe whether a window of a software application or the software application itself is active or more active as compared to another software application running on the first device 101. An active window or software application can correspond to the window or software application that is currently selected or clicked in or maximized. For example, an active window can be a window of a web browser that the user is scrolling through. In an embodiment, this can be achieved by querying the OS memory space and each computing memory space in the main memory for existing sub-memory spaces, querying the OS memory space and each computing memory space in the main memory for a rank or hierarchical relationship between (software application) sub-memory spaces found, recording the list of sub-memory spaces and the rank relationship between sub-memory spaces, and associating the list of sub-memory spaces and the rank relationship between the sub-memory spaces with the array. For example, a window of a first application can be an active window on the first device 101 and has a higher rank than an inactive window of a second application also running on the first device 101. The active window can be the window the user has currently selected and displayed over all other windows on the display of the first device 101. Notably, there can be multiple visible windows, but one of said multiple visible windows can have a higher rank because it is currently selected by the user and is the active window.

For example, two documents can be viewed in a split-screen side-by-side arrangement without any overlap of one window over another window, and a third document can be covered by the two documents in the split-screen side-by-side arrangement. In such an example, the user can have one of the two split-screen documents selected, wherein the selected document is the active window and would have a higher rank (the highest rank) than the other of the two split-screen documents since the higher (highest) ranked document is selected by the user. The third document behind the two split-screen documents would have a lower rank (the lowest rank) than both of the two split-screen documents since it is not visible to the user. Upon bringing the third document to the front of the display and on top of the two split-screen documents, the third document rank would then become the highest rank, while the two split screen documents' rank would become lower (the lowest) than the third document (and the rank of the two split screen documents can be equal).

In an embodiment, the rank can be determined based on eye or gaze tracking of the user (consistent with or independent of whether a window is selected or has an active cursor). For example, a first window and a second window can be visible on the display, wherein the first window can include a video streaming from a streaming service and the second window can be a word processing document. The rank of the first window and the second window can be based on, for example, a gaze time that tracks how long the user's eyes have looked at one of the two windows over a predetermined time frame. The user may have the word processing document selected and active while the user scrolls through the document, but the user may actually be watching the video instead. In such a scenario, an accrued gaze time of the first window having the video can be, for example, 13 seconds out of a 15 second predetermined time frame, with the other 2 seconds in the predetermined time frame being attributed to looking at the first window having the word processing document. Thus, the rank of the first window having the video can be higher than the rank of the second window because the gaze time of the first window is higher than the gaze time of the second window. Notably, if there is only one open window, the rank of that window would be ranked as the top-ranked window (because it is the only window) regardless of/independent from other user input, such as gaze, selection, etc.

In an embodiment, the rank can be determined based on the eye tracking and a selection by the user. For example, the user can select the first window having the video and looking at a description of the video playing in the same first window. In such a scenario, both the eye tracking accruing a longer gaze time (than the second window) and the user selecting the first window to make it the active window can make the first window the top-ranked window.

Thus, the rank can be determined based on one or a plurality of elements. The more elements being used, the more accurate the determination of the rank. Hence, the rank can be determined by a combination of eye or gaze tracking, an input selection by a user (for example, the user clicking on an icon or a display element in a window (the first window or the second window), a user hovering a mouse or pointer over a portion of a window (without necessarily clicking or selecting anything), etc. The rank determination can also go beyond these elements/factors to include preset settings related to a particular user and/or past behavior/experiences. For example, the user can preset certain settings and/or the user's device can learn from user's past behavior/experiences about his/her preference when two or more windows are displayed at the same time side by side.

For example, this particular user may always play a video in the first window while working on a presentation in the second window. In such case, the user's device can learn from this behavior and use this knowledge to more accurately determine the rank (for example, when the first window has a video playing and the second window corresponds to a work processing document or a presentation, the active window is likely the second window). Such knowledge can be paired with eye gaze direction and other factors such as mouse/cursor movement, etc. in order to more accurately determine the rank.

In an embodiment, in step 420, the inspected main memory data can also include a reference patch therein and the first device 101 can identify the reference patch in the main memory data. In an embodiment, the first device 101 can detect and identify the reference patch in the main memory by a value, such as a known encoding, where the format of the of the data itself can indicate to the application where the reference patch is located. For example, the known encoding can be 25 bytes long and in a predetermined position within the binary bits of the main memory. In an embodiment, the reference patch can be identified by parsing an application (e.g. a Word document), looking through the corresponding metadata in the computing memory space, and finding the reference patch in the metadata by attempting to match the metadata with a predetermined indicator indicating the presence of the reference patch, such as the unique identifier.

In step 425, the first device 101 can determine whether the software application corresponding to the computing memory space (and sub-memory space) in which the reference patch was identified is active or in the displayed data. Referring to the example of step 415, while the window of the first application can include the reference patch, the inactive window of the second application can become active and overlay over the window of the first application which was previously the active window. In such a scenario, the reference patch in the window of the first application can become covered by the window of the second application. As such, the secondary digital content of the reference patch in the window of the first application need not be displayed or can cease being displayed. However, in an alternative scenario, the window of the first application, including the reference patch, can be active and the reference patch therein can be uncovered and visible.

In step 430, upon determining the software application corresponding to the computing memory space (and sub-memory space) in which the reference patch was identified is active or in the displayed data, the first device 101 can decode the encoded data of the unique identifiers from the area of the reference patch, wherein the unique identifiers correspond to the surface area.

In step 435, the first device 101 can use the unique identifiers to link the surface area with the digital content using metadata and retrieve the digital content based on the unique identifiers.

In step 440, the first device 101 can overlay the digital content onto the surface area of the displayed data based on the unique identifiers.

Again, the method of identifying the reference patch included in the displayed data and augmenting the displayed data is described as performed by the first device 101, however, the second device 150 can instead perform the same functions.

Figure 4B:
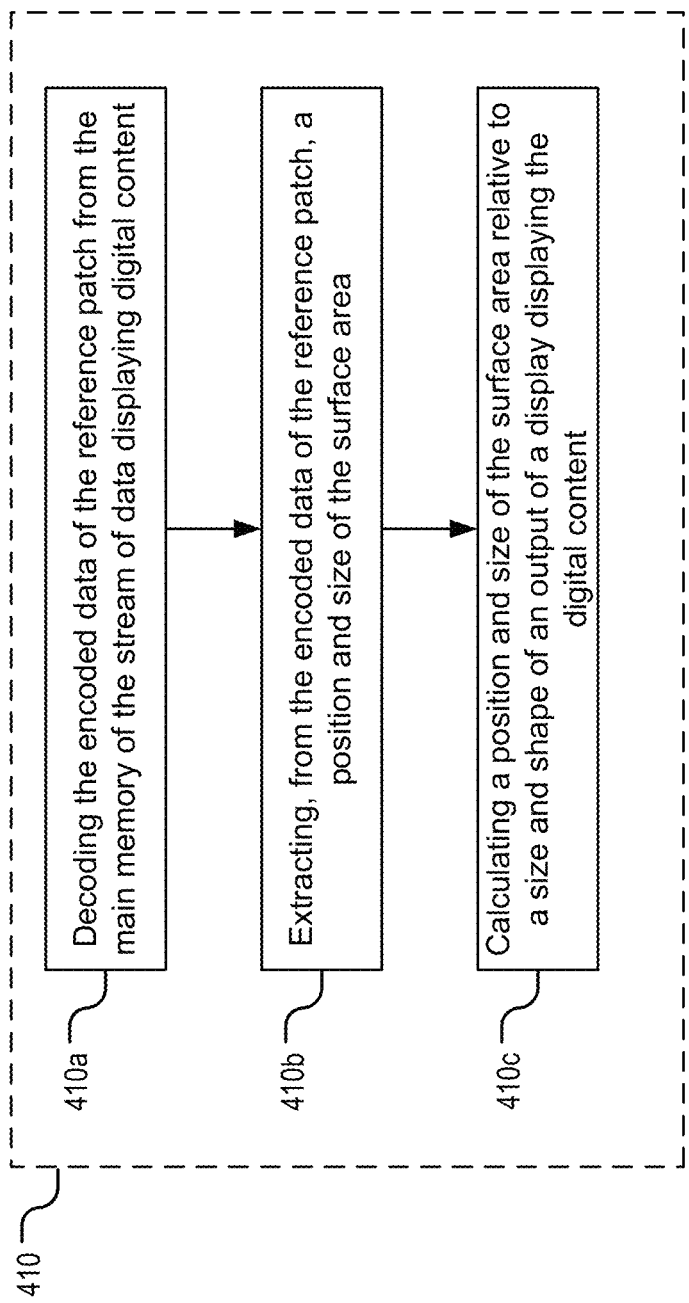
FIG. 4B is a flow chart of a sub-method of identifying the reference patch with the unique identifiers corresponding to the surface area from the stream of data, according to an exemplary embodiment of the present disclosure.

In an embodiment, the first device 101 identifies the surface area corresponding to the reference patch by employing further processes. To this end, FIG. 4B is a flow chart of a sub-method of identifying the reference patch with the unique identifiers corresponding to the surface area from the stream of data, according to an embodiment of the present disclosure.

In step 410a, the first device 101 can decode the encoded reference patch from the main memory. The encoded reference patch can include the marker that makes up the unique identifiers within the reference patch incorporated previously. The reference patch can also include other identifying information. The marker can be disposed within the reference patch, such as within the area of the reference patch or along a perimeter of the reference patch, or alternatively, outside of the area of the reference patch.

Again, whatever schema is used to encode the marker in the reference patch is also used in reverse operation to decode the underlying information contained within the reference patch. As stated above, in an embodiment, the encoded marker can be patterns generated and decoded using the ARUCO algorithm or by other algorithms that encode data according to a predetermined approach.

Similarly, as described above, in step 410b, the first device 101 can also extract attributes of the surface area from the reference patch.

Similarly, as described above, in step 410c, the first device 101 can also calculate a position and size of the surface area relative to the size and shape (dimensions) of the output signal from the display that is displaying the displayed data.

Similarly, as described above, the first device 101 can provide information regarding the characteristics of the output video signal, such that the digital content that is later overlaid can correctly be displayed to account for various manipulations or transformations that may take place due to hardware constraints, user interaction, image degradation, or application intervention.

Similarly, as described above, the reference patch itself can be used as the reference for which the digital content is displayed on the surface area.

Similarly, as described above, the first device 101 can determine an alternative location at which to display the digital content based on behaviors of the user.

Figure 4C:
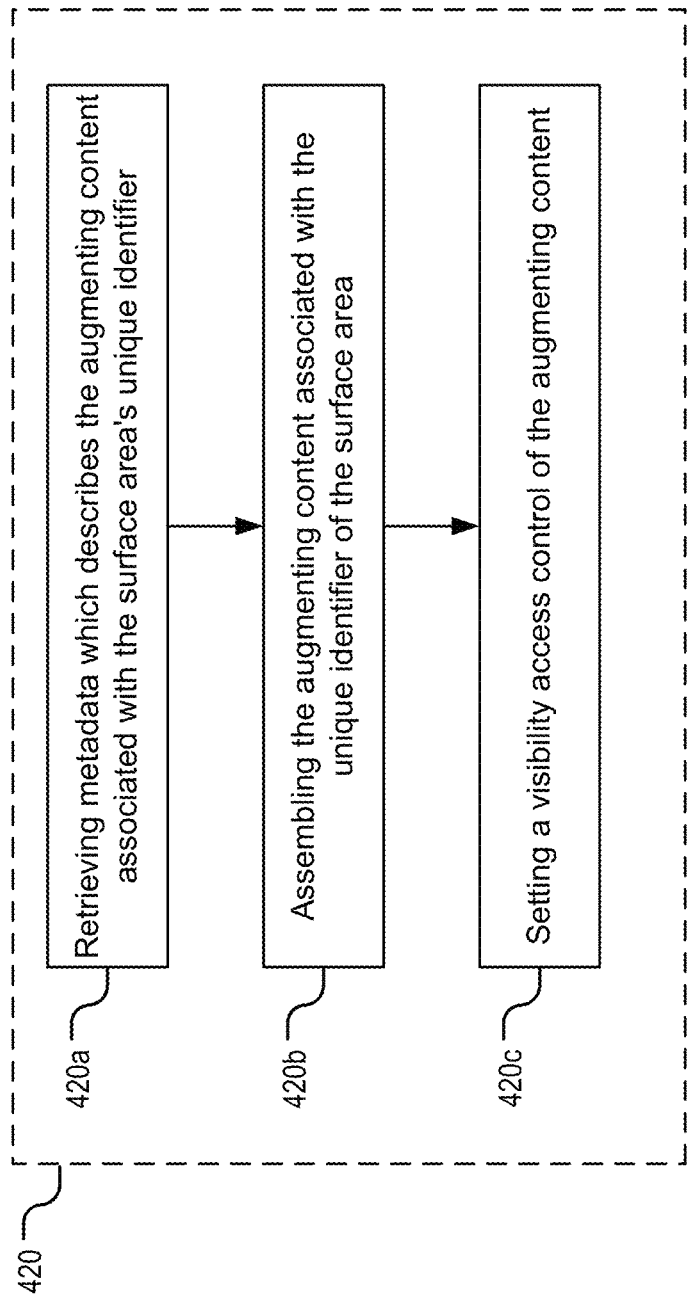
FIG. 4C is a flow chart of a sub-method of associating the unique identifiers with digital content, according to an exemplary embodiment of the present disclosure.

In an embodiment, the first device 101 employs other processes to associate the unique identifiers with the digital content. To this end, FIG. 4C is a flow chart of a sub-method of associating the unique identifiers with digital content, according to an embodiment of the present disclosure. In step 420a, the first device 101 can send the unique identifiers to the second device 150 and the second device 150 can retrieve metadata that describes the digital content, the digital content being associated with the surface area through the unique identifiers. This can be done by querying a remote location, such as a database or a repository, using the unique identifiers of the surface area as the query key. In an embodiment, the first device 101 sends the unique identifiers to the second device 150 and the second device 150 associates the unique identifier of the reference patch to corresponding digital content based on the metadata. The metadata associated with the surface area's unique identifier can be transmitted to the first device 101 with the augmentation content.

In step 420b, the first device 101 can assemble the digital content that is associated with the surface area's unique identifier. The assembly can entail loading the necessary assets for assembling the digital content. In an embodiment, this can entail loading manipulation software or drivers in order to enable the first device 101 to process the digital content. Other assembling processes can be the loading of rendering information in order to transform and manipulate an individual portion of the digital content. Furthermore, the loaded manipulation software, drivers, or rendering information can be used to compile all the individual portions of the entire digital content together. In an embodiment, this can include adapting the file formats of the digital content, delaying the playback for the digital content, converting from one format to another, scaling the resolution up or down, converting the color space, etc.

In step 420c, the first device 101 can provide access control parameters for the digital content. The access control parameters can dictate whether the digital content is visible to some users, or to some geographical locations, or to some types of displays and not others, as well as the date and time or duration of time a user can access the digital content or is allowed to access. In an embodiment, visibility of the digital content can be defined for an individual. For example, the digital content can be a video that is appropriate for users over a certain age. In an embodiment, visibility of the digital content can be defined for a geographic location. For example, the digital content can be a video that is region-locked based on a location of the first device 101. In an embodiment, visibility of the digital content can be defined for a type of display displaying the displayed data. For example, the digital content can be VR-based and will only display with a VR headset. In an embodiment, visibility of the digital content can be defined for a predetermined date and a predetermined time. For example, the digital content can be a video that will only be made publicly available after a predetermined date and a predetermined time. In an embodiment, visibility of the digital content can be defined for a time period. For example, the digital content can be a video that is only available for viewing during a holiday. The first device 101 thus calculates the user's access level based on those parameters and provides an output result as to the user's ability to access the digital content, i.e., whether the digital content will be visible or invisible to the user. Note that the access control parameters can be global, for all the displayed data, or it can be localized per surface area and the underlying digital content.

Referring again to FIG. 4A, in step 440, the first device 101 can carry on the processes of overlaying the surface area with the digital content into the displayed data in accordance with the surface area, the position, and the size identified by the unique identifier. The first device 101 can determine or adjust the size and location of the assembled digital content on the surface area relative to the size and shape of the displayed data being outputted by the display. Then, the first device 101 can render the associated digital content (or the assembled individual portions) over the surface area's shape and perimeter using the size and location information. Thus, the digital content is superimposed on top of the surface area.

The first device 101 can continuously monitor changes that are taking place at the end user's device (such as the second device 150 of the second user) to determine whether the reference patch and/or the surface area has moved or been transformed in any way (see below for additional description). Thus, the first device 101 can continuously inspect subsequent frames of the stream of the data (for example, every 1 ms or by reviewing every new frame), displaying the displayed data, to determine these changes. The first device 101 can further continuously decode the reference patch's data from the identified reference patch. Then the first device 101 can continuously extract attributes from the data, the attributes being of size, shape, and perimeter and comparing those changes between the current frame and last frame. Further, the first device 101 can continuously calculate the size and location of the surface area and compare changes between the size and location of the surface area from the current and the last frame and then continuously overlay the digital content on the surface area by incorporating the changes in the reference patch's attributes and the changes in the size and location of the surface area. As stated above, when the user manipulates his/her display device by scaling, rotating, resizing or even shifting the views from one display device and onto another display device, the first device 101 can track these changes and ensure that the digital content is properly being superimposed onto the surface area.

In an embodiment, the methodologies discussed with reference to FIG. 3 that use the frame buffer can be used without using the methodologies discussed with reference to FIG. 4 that use the memory space and vice-versa. In other words, in an embodiment, either the methodologies of FIG. 3 or the methodologies of FIG. 4 can be used to identifying a reference patch and overlay the digital content in displayed data.

However, in an embodiment, both the methodologies discussed with reference to FIG. 3 that use the frame buffer and the methodologies discussed with reference to FIG. 4 that use the memory space can be used together. In such embodiment, a device can use both approaches to accurately identify the same reference patch (applying both approaches can yield better results). In an embodiment, both approaches can be used to identify different reference patches. For example, if a document includes a plurality of reference patches, the first device can apply the methodologies discussed with reference to FIG. 3 to a first reference patch, while applying the methodologies discussed with reference to FIG. 4 to a second reference patch.

In an embodiment, the digital content can be a translation overlay as described below.

Figure 5:
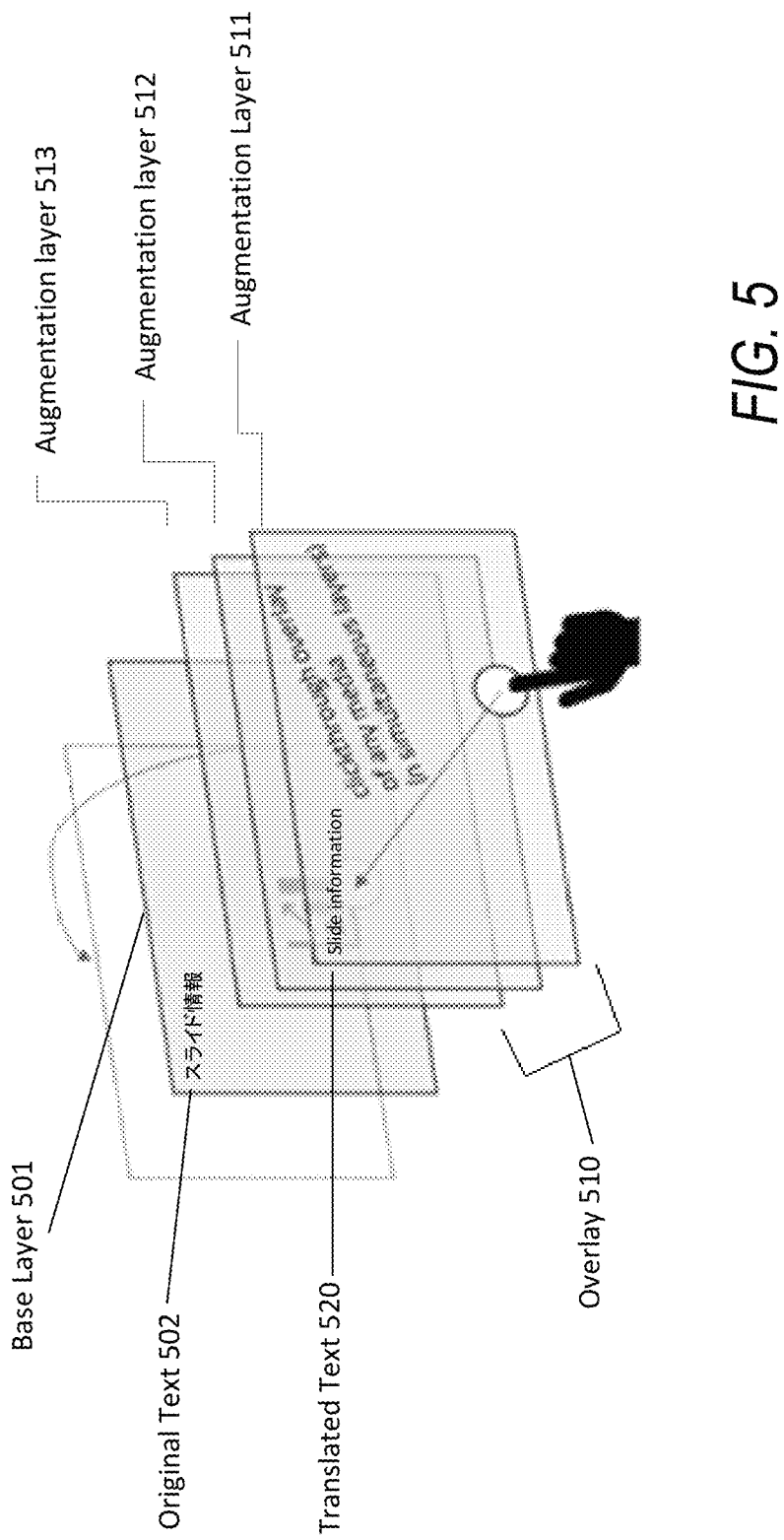
FIG. 5 is an illustration of an exemplary user experience of the dynamic translation display overlay, according to an embodiment of the present disclosure.

FIG. 5 shows an exemplary augmented user experience generated by the processes of the present disclosure. The displayed data (e.g. the frame) may be referred to as a "base layer". As shown, the base layer 501 comprises original text 502 (shown in Japanese for exemplary purposes). This text can be part of a base layer digital object described below. Shown overlaid over the base layer is the overlay 510 which comprises one or more augmentation layers 511, 512, and 513, the overlay comprising translated text 520.

For example, the base layer 501 may contain slides presented as part of a slideshow (for example, in a Microsoft PowerPoint presentation). Those slides may have images, video, text such as original text 502, and/or other visual information displayed on them. The slides may have interactive elements described below. It may be advantageous or desirable for a user to have the Japanese language text translated into English. The overlay 510 can be used to simultaneously obscure the original Japanese language text and display the translated English text. Due to the finite amount of slide area available, it can be advantageous to use the display area taken up by the original Japanese text, which is incomprehensible to this particular user, to display the translated English text. In this way, the translated English text can match the position of the original Japanese text. In other words, the translated text can be displayed at a position corresponding to the original position of the Japanese text.

The original Japanese text can be a label for a graph. For proper communication, the translated English text label can be the same position as the original Japanese text so it can be understood by the user to be such a label and to be applied to the proper portion of or information in the graph. If the original Japanese text were still visible, the translated English text would have to either be superimposed over the original Japanese text, creating an unreadable visual jumble of indistinguishable letters and/or characters or the translated English text would have to be displayed in a different position within the area of the slide, causing possible miscommunication or confusion. To achieve this obscuring of the original text 502, the overlay can have non-transparent pixels which can make up an overlay digital object present in an augmentation layer to form a non-transparent overlay digital object (such as a text box or a covering rectangle) which can be positioned over the original text 502. The translated text 520 can be displayed in an augmentation layer (such as layers 511-513). The translated text 520 can be displayed in the same augmentation layer as the non-transparent overlay digital object (e.g. the text being positioned within the text box) or can be displayed in another augmentation layer and positioned over the non-transparent overlay digital object (e.g. text box positioned over the covering rectangle).

An overlay digital object which contains a translated text 520 may be referred to as an "overlay text-containing object" while an overlay digital object which does not contain a translated text 520 may be referred to as an "overlay mask". Overlay masks may be useful for obscuring portions of the original text 502 which are not obscured by an overlay text-containing object. Overlay masks may be particularly useful in situations where, for example, there is a large discrepancy between the area of a display taken up by an original text compared to a translated text. This way, the original Japanese text which is a label on a graph can be obscured (i.e. not visible to a user), the translated English text can be displayed in the position of the original Japanese text, and the rest of the graph and slide can be visible to the user.

The slides, in addition to comprising Japanese text, can contain text in other languages (e.g. English) which a user does not wish to or intend to be translated by the apparatus. In an embodiment, the apparatus can be configured so as to translate a first language present in the display information but not translate a second language or a certain subset of the first language (e.g. numerals) present in the display information.

Figure 6:
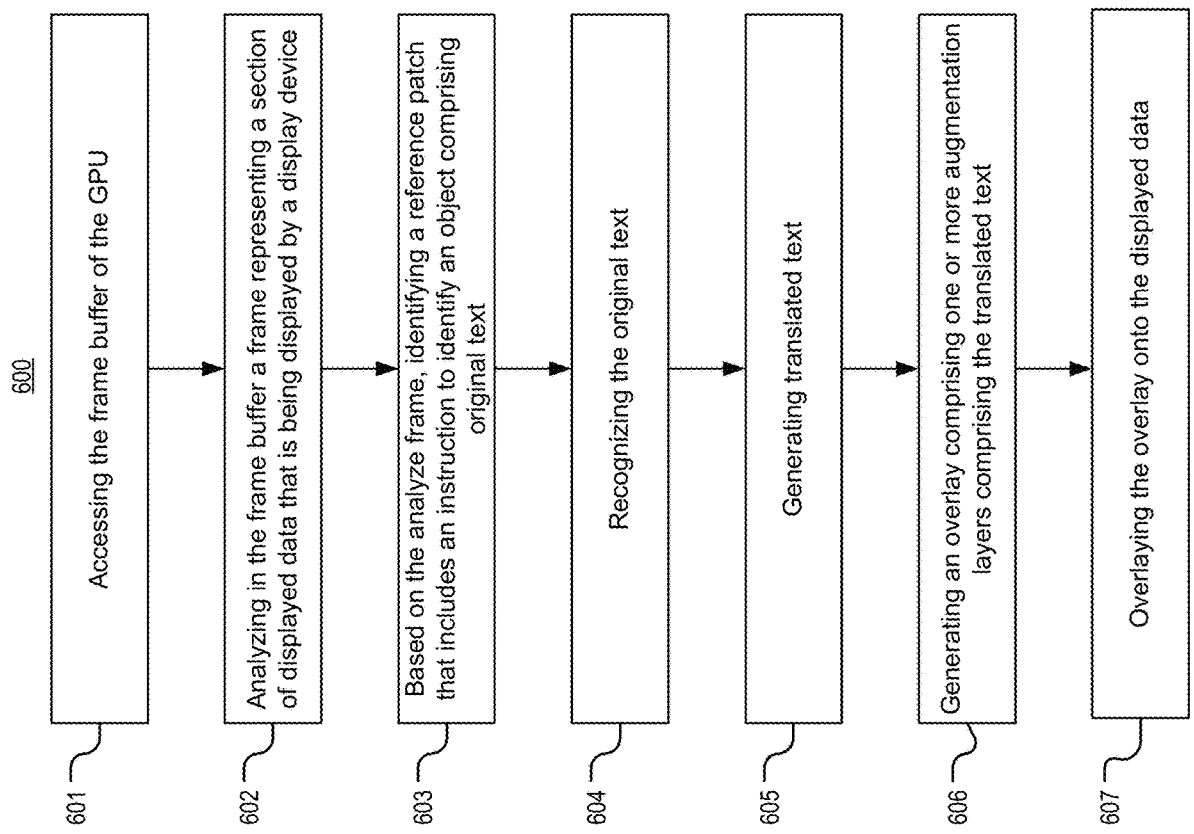
FIG. 6 is a flowchart of a method, according to an embodiment of the present disclosure.

In order to achieve the functionality described above, the apparatus of the current disclosure can perform the following process. FIG. 6 depicts a flowchart outlining the process involved in generating and displaying the dynamic translation display overlay according to an embodiment of present disclosure. The first step is accessing 601 the frame buffer of the GPU. The second step is analyzing 602 in the frame buffer of the GPU, a frame representing a section of displayed data that is being displayed by a display device. The third step is, based on the analyzed frame, identifying 603 a reference patch. This reference patch can include various data as discussed above and/or an instruction to identify an object comprising original text and translate such object. The fourth step is recognizing 604 the original text. The fifth step is generating 605 translated text from the original text. The sixth step is generating (or composing) 606 an overlay comprising an augmentation layer. The augmentation layer includes the translated text. The seventh step is overlaying 607 the overlay, onto the displayed data such that the translated text is viewable while the original text is obscured from view.

In an embodiment, the apparatus of the current disclosure can perform a process substantially similar to that described above but not involving a reference patch. For example, such a process may, in step 603, directly analyze the frame to identify an object comprising original text, then proceed to recognize the original text. Such a method may be substantially similar in subsequent steps to the method described above. Such a method would not require the instruction provided by the reference patch. Said instructions may instead be received from some other source, such as hardware settings, firmware settings, application settings, another application, another device, or user input.

Note that in an embodiment, the process of FIG. 6 may be performed using the methodologies discussed with reference to FIG. 4. In other words, the reference patch can be identified using the memory as opposed to the frame buffer. Of course, in an embodiment, both the frame buffer and the memory may be used to identify the same reference patch (or different reference patches), as discussed above.

In an embodiment, the first device 101 can perform the entire aforementioned process. In an embodiment, the process can be performed by a first device 101 and any number of other devices (102 and 10n). For example, a first device 101 can perform the analyzing and detecting described above. The base layer objects or regions and/or attributes thereof can be transmitted to a third device 102 which performs the recognizing, generating translated text, generating/composing the overlay, and overlaying. The first device 101 can be used by a user acting as an information provider as described above. Such a device could be referred to as a "provider device" or "presenter device". A user using such a device could be referred to as a "presenter" or "presenting user". The presenter device can transmit display data as well as data corresponding to the base layer objects or regions and or attributes thereof to a third device 102 that can be used by a user acting as an information recipient as described above. Such third device 102 could be referred to as a "recipient device" or "viewer device". A user using such third device 102 could be referred to as a "viewer" or "viewing user". The third/viewer device 102 can perform the other steps of the process described above. This may be advantageous for reasons including bearing a portion of the total processing load on the presenter device to lessen processing load on the third device or speeding processing on the third device 102. In an embodiment, there is a presenter device and any number of viewer devices. Such arrangements of multiple devices each performing a portion of the method are contemplated to be embodiments of the content of the present disclosure. It should be understood that in the following, different devices (the first device 101 and/or other devices 102, 10n) can perform any combination of steps of the process/method.

In other words, one or more of the devices of FIG. 1 may perform some or all of the process of FIG. 6. For example, the third/viewed device 102 can perform the process of FIG. 6 locally. As a further example, the third/viewer device 102 may send requests/instructions and communicate with a server (such as device 150 of FIG. 1). In an embodiment, the server may perform the process of FIG. 3 and send the results back to the third/viewer device 102. This can help ease the burden on the processing power of the third/viewer device 102.

This augmentation performed by the first device 101 (or by a combination of the first device 101 and any number of other devices 102, 10n as described above) can be capable of automatically (i.e., without a specific user input directing the particular initiation, action, or parameters of) detecting and/or identifying one or more base layer digital objects which each comprise text. Such automatic operation of the augmentation does not imply that a user is completely unable to control the action of the automation. For example, a user may be able to turn on or off the action of the augmentation (i.e. turn on/off automatic translation), select which languages to translate and even which languages and/or characters to not translate, and/or control text attributes of the translated text. The automatic operation is intended to convey that a user need not, for example, interact with specific original text, instruct the first device 101 to provide a translation, select parameters for the translation of that specific original text, and instruct the first device 101 to display the translation. The base layer digital objects can be present in a section of displayed data that is being displayed by the first device 101. The text which is present in the one or more base layer digital objects can be referred to, individually or collectively, as "original text".

In an embodiment, the augmentation performed by the first device 101 (or by a combination of the first device 101 and any number of other devices 102, 10n as described above) may be controlled by the reference patch. That is, the reference patch may contain, in addition to the instruction to identify an object comprising original text (and/or translating such original text), additional instructions related to the operation of the augmentation. Such additional instructions may be or contain, for example, the language of the original text, parameters of the original text and/or translated text such as size, position, type face, font size, color, etc., the presence and/or parameters of non-text objects present in the base layer, instruction related to obscuring vs not obscuring non-text objects present in the base layer, the translation language target. Of course, in an embodiment, the instruction can indicate obscuring certain areas on the base layer, while not obscuring others. For example, if the original text includes 5 words, the instruction can indicate that the first 2 words are to be obscured from view, while the other 3 words re not to be obscured such that a user can see these words.

In general, any number of reference patches may be present or detected. For example, a single reference patch may be used to initiate and/or control an augmentation for an entire document or slide deck. A single reference patch may be used for each page or slide in a document to initiate and/or control an augmentation for that single page or slide. A single reference patch may be used for each base layer digital object comprising original text to initiate and/or control an augmentation for that base layer digital object.

In an embodiment, the first device 101 detects and/or identifies the one or more base layer digital objects as described above. Following this detection, the first device 101 recognizes the original text(s) present in the base layer digital object(s). In an embodiment, the recognizing is performed by the first device 101. In an embodiment where the first device is acting as a presenter device as described above and another device 102, 10n is acting as a viewer device, the other device 102, 10n performs the recognizing described below. For example, the recognition can be or include optical character recognition (OCR), optical word recognition (OWR), intelligent character recognition (ICR), intelligent word recognition (IWR), or a combination of these.

The recognizing can involve detection, identification, measurement, or other tabulation or recording of suitable text attributes or formatting. Examples of such text attributes or formatting include, but are not limited to typeface, font size, color, highlighting, alignment, character spacing, line spacing, bulleting, numbering, indentation, capitalization, subscripting/superscripting, bolding, italics, underlining, strikethrough, shadows, outlining, filling, reflection, glow, bevel, depth, and contouring. The original text(s) can be in a single language, or can be in multiple languages. The original text(s) can comprise more than one type of text. Each type having different attributes and/or be in different languages. For example, the base layer can comprise text corresponding to different text or document sections (e.g. title, subtitle, heading, sub-heading) or text levels (first bullet point or numbering level, second bullet point or numbering level, etc.). In one embodiment, the text recognition can recognize each type of text as a separate original text. In one embodiment, the text recognition can group one or more types of text into single original text. Such groupings can retain information about the attributes or combinations of attributes of the original text.

The recognizing can involve or comprise the production by the first device 101 of an original transcript. The original transcript can comprise additional information beyond a string or sequence of characters. For example, the original transcript can comprise text which has been pre-processed for translation. Such pre-processing can involve segmentation, chunking, analysis, or combinations thereof. Segmentation refers to dividing a string or sequence of characters into units from which meaning can be derived, such as words, sentences, topics, and the like. Segmenting text into individual words is referred to as "word segmentation" or "word boundary detection". Segmenting text into sentences is referred to as "sentence segmentation", as well as "sentence breaking", sentence boundary detection", and "sentence boundary disambiguation". Chunking refers to analysis of a sentence which identifies and links constituent parts of sentences (e.g. nouns, verbs, adverbs, adjectives, etc.). Chunking can also be referred to as 'light parsing" or "shallow parsing". Chunking can comprise or involve part-of-speech tagging (also called grammatical tagging), which identifies a particular word as a certain part of speech.

The recognized text is then used to generate translated text. The generation of the translated text can be referred to as "translating" or "translation of" the original text. Such translation of the original text can be performed by a translation apparatus. In one embodiment, this translation apparatus can be a component of or integrated into the first device 101 (or the device performing the features of FIG. 6). In one embodiment, the translation apparatus can be a component of or integrated into the second device 150 or other device 102, 10n (and therefore external to the first device 101). In such an embodiment, the first device 101 or a component thereof can be configured to communicate (i.e., transmit and/or receive) information with the translation apparatus. For example, the translation apparatus can be a server connected to the first device 101 by the internet (e.g., cloud translation server). In some embodiments, the translating is performed by or involves the transmission of a translation request. The translation request can be composed, generated, or formed by the first device 101. The translation request can be composed, generated, or formed by another device 102, 10n. The translation request can then be transmitted to the translation apparatus.

The translation request comprises the original text (i.e., the text to be translated) and a translation language target. The translation language target provides instruction to the translation apparatus as to the language that the original text should be translated into. The translation language target can be retrieved from a target language data source. In an embodiment, the target language data source is the reference patch. The translation language target can be or comprise user input data. For example, a user can select a desired target language as part of normal use or operation of the apparatus or method of the current disclosure. This selection can occur, for example, upon system boot, opening a specific program or application, opening a file within a specific program or application, initiation of a connection to a second device, or the like. In an embodiment, the translation language target can be detected, scraped, or mined from a separate apparatus or part of an apparatus (e.g. CPU or other processor, RAM or other dynamic memory, or hard drive or other static memory), firmware, or software (e.g. a language setting in an operating system). Such detection or mining can be performed automatically.

The translating can be performed using any suitable technique or combination of techniques. For example, the translation can comprise or involve text chunking, word segmentation, sentence segmentation, lexical analysis, sentiment analysis, concept mining, deep linguistic processing, parsing, or combinations thereof. The translation can be rule-based, transfer-based, interlingual, dictionary-based, statistical, example-based, hybrid, neural, or combinations thereof.

In an embodiment, the translating is performed by the first device 101 as described above. In an embodiment where the first device is acting as a presenter device as described above and another device 102, 10n is acting as a viewer device, the other device 102, 10n performs the translating described above. In an embodiment where the first device is acting as a presenter device as described above and another device 102, 10n is acting as a viewer device, the second device 150 performs the translating described above.

In some embodiments, the translated text can then be received by the first device 101. The translated text can be received from a separate portion or apparatus located within the first device 101, a second device 150, or other device as described above. The second device 150 or other device can be connected to the first device 101 directly through, for example a computer-to-computer connection or network connection or indirectly through intervening devices such as servers, the cloud, or internet.

The translated text(s) can then be used in generating an overlay which can be displayed on a display device. In an embodiment, the generating is performed by the first device 101. In an embodiment where the first device is acting as a presenter device as described above and another device 102, 10n is acting as a viewer device, the other device 102, 10n performs the generating and overlaying described below. The overlay can display the translated text(s) such that the translated text(s) is/are visible to the user. The overlay can also obscure the original text(s) such that the original text(s) is/are not visible to the user. The overlay comprises one or more augmentation layers 511-513. The augmentation layers comprise one or more overlay text-containing objects each comprising the translated text. The augmentation layers can comprise one or more overlay masks.

The overlay can comprise pixels which are non-transparent (i.e., transparency less than 100%, preferably less than 90%, preferably less than 80%, preferably less than 70%, preferably less than 60%, preferably less than 50%). Such non-transparent pixels can be useful in obscuring the original text(s). The non-transparent pixels can be present in a single augmentation layer or in multiple augmentation layers as appropriate. The overlay can further comprise pixels which are transparent. The overlay can comprise pixels which are opaque (i.e. 0% transparency).

The overlay layer can comprise one or more overlay text-containing objects, each comprising translated text. The overlay text-containing objects can be present in one or more of the augmentation layers 511-513. For example, there can be one or more augmentation layers 511-513 that contain one or more overlay text-containing objects and there can be one or more augmentation layers which do not contain an overlay text-containing object. In some embodiments, overlay text-containing objects are present in a single augmentation layer. In such an embodiment, the augmentation layer can comprise all of the overlay text-containing objects present in the overlay. That is, the overlay text-containing objects are arranged into a single augmentation layer. Such an augmentation layer can be referred to as a "text layer", a "translation layer", an "overlay object layer" or similar term.

The overlay text-containing objects are digital objects (as described above) which can be specifically useful for displaying the translated text(s). The overlay text-containing objects can comprise non-transparent pixels as described above for displaying the translated text to the user. Such non-transparent pixels can be opaque as described above. The overlay text-containing objects can comprise transparent pixels. The overlay text-containing objects can have any suitable object attributes, such as size, shape, position, or orientation. The overlay objects or the attributes thereof can be related to one or more of the base layer objects and/or one or more of the original texts. Such a relation can comprise attributes of the base layer objects and/or original texts, for example the vertical position, horizontal position, vertical extent, horizontal extent, color, texture, size, orientation etc. In one embodiment, the overlay objects are not related to one or more of the base layer objects and/or one or more of the original texts. The overlay text-containing objects can be sized and positioned so as to not obscure objects, pictures, videos, or other features of the background region which are not the original text(s).

The overlay text-containing objects display the translated text(s). The translated text(s) can have any suitable text attributes or formatting. Examples of such text attributes or formatting include, but are not limited to typeface, font size, color, highlighting, alignment, character spacing, line spacing, bulleting, numbering, indentation, capitalization, subscripting/superscripting, bolding, italics, underlining, strikethrough, shadows, outlining, filling, reflection, glow, bevel, depth, and contouring. In one embodiment, the translated text can have similar attributes and/or formatting as the original text. In one embodiment, the translated text can have dissimilar attributes and/or formatting from the original text. For example, the translated text can be displayed in a different color or font size to enhance readability.

In an embodiment, the pixels which comprise the overlay text-containing objects may have pixel attributes which are matched to a portion of the base layer. For example, an original text may be present on a background. This background may be a solid color, a gradient, a texture, a picture, a video, or other visual feature. In order for the overlay to obscure the original text, some non-transparent pixels (here meaning pixels having a transparency less than 100%) may be necessary to include which cover the characters or other markings which make up the original text. While some of these non-transparent pixels may correspond to characters displayed as the translated text, there will not be a perfect pixel-by-pixel match between the original text and the translated text (if there were a perfect match, the original text and translated text would be identical and therefore not translated). Thus, there may be pixels present in the overlay which should be non-transparent in order to obscure the original text but which are not used in displaying the translated text. Such pixels may be controlled to have attributes which match attributes present in pixels in a proximal portion of the base layer. This matching may be advantageous for avoiding the presence of off-color or unsightly shapes, borders, outlines, or the like visible to a user near the translated text. The overlay may instead have pixels, objects, or regions which have attributes which are intended to render the presence of the overlay undetectable to a user. This may be advantageous for hiding the presence of the overlay from a user or preventing obscuring of non-text information present in the base layer in the region of original text. The attributes of such pixels may be derived from, matched to, approximated by, interpolated from, or otherwise linked to pixels present in the base layer at the same location or near the overlay text-containing object.

In general, such derivation, detection, matching, approximation, interpolation, and the like for obtaining the attributes of such pixels may be performed by any suitable method known to one of ordinary skill in the art. In an embodiment, the attributes of such pixels are obtained as part of the analyzing the section of displayed data. In an embodiment, the attributes of such pixels are obtained as part of the identifying one or more base layer objects or regions. This may be referred to as "background matching" or other similar term.

In an embodiment, the pixels present in the overlay which should be non-transparent in order to obscure the original text but which are not used in displaying the translated text may have attributes which are not matched to a portion of the base layer. In such an embodiment, such pixels may be given attributes which are different from the base layer. These differences may be advantageous for increasing the visibility or readability of the translated text. For example, dark colored text on a dark background may be difficult for users to see or read. By providing a light colored border, outline, or text box on which the translated text may be displayed may make the text easier for a user to read. In general, such a border, outline, or text box may be any suitable size or have any suitable position in the overlay or with respect to the base layer.

In an embodiment, the attributes of the pixels present in the overlay text-containing objects may be controlled by user settings, preferences, or inputs. For example, a user may prefer all translated text to be black text on a white background. The overlay may thus be configured to always provide the translated text as black characters comprised of black non-transparent pixels. The overlay text-containing object may further comprise white non-transparent pixels. Such white non-transparent pixels may give the illusion or appearance of a white background on which the black translated text is displayed. In another example, a user may prefer to increase a text-background contrast, brightness difference, or similar property. Such an increase may enhance visibility or readability to a user. This preference may be part of an "enhanced visibility" setting. Such a preference may, instead of providing a single option like black text on a white background, change attributes of the non-transparent pixels present in the text-containing overlay object to achieve enhanced visibility. In an embodiment, the pixels present in the overlay which should be non-transparent in order to obscure the original text but which are not used in displaying the translated text may be matched to or similar to the region of the base layer as described above but the translated text may be displayed using pixels having attributes (color, brightness, etc.) which are different from the original text. For example, the original text may be displayed as white characters on a blue background while the translated text may be displayed as yellow characters on a similar blue background. Such changes in color may be referred to as a "color swap", a "palate swap", or other similar term.

In an embodiment, the enhanced visibility setting or other user preference or setting may control the typeface for use displaying the translated text. For example, a user may prefer a serif or sans-serif font. Such a preference may be different for different contexts, such as a slide deck compared to a video or the like. In another example, the translated text may be displayed using a typeface intended or designed for alleviating dyslexia. Such a preference may be advantageous to include in the enhanced readability setting(s). In an embodiment, the enhanced readability setting(s) may include a colorblindness setting. Certain combinations of colors may be difficult or impossible for a user having a colorblindness to discern. The presence of such combinations may make text invisible to a user having a colorblindness. By performing a color swap or palate swap described above, such color combinations may be eliminated, rendering text visible and/or readable to such users. The presence of such color combinations may be detected automatically, for example as described above. The color combinations may be different depending on the specific type of colorblindness. The enhanced readability setting(s) may allow a user to input a specific type of colorblindness. Then, colors or color combinations which may be difficult or impossible for the user to discern may be automatically detected and eliminated in the overlay by swapping as described above.

In an embodiment, the enhanced visibility setting or other user preference or setting may control an increased font size for the translated text (as opposed to the original text). This increased font size may also be advantageous for increasing visibility or readability of the translated text.

In an embodiment, the overlay text-containing objects may be displayed in a region or location of the overlay which corresponds to the location of the original text. In an embodiment, the overlay text-containing objects may be displayed in a region or location of the overlay which does not correspond to the location of the original text. Such a change in the location of the overlay text-containing object(s) compared to the location of the original text(s) may be referred to as "translocation". This translocation may be advantageous for preventing the obscuring of non-text information or features present in the base layer. In the example of Japanese text which is a label on a graph, the translated English text can be displayed in a location which does not correspond to the position of the original Japanese text, while still maintaining the rest of the graph and slide visible to the user. This may be particularly advantageous in situations where an extent (vertical, horizontal, or both) of the translated text is substantially different from an extent of the original text. Examples of such situations include but are not limited to the font size change described above, the text orientation change described above, and the overall character difference described above.

In an embodiment, the overlay text-containing object may be translocated to a location such that it does not obscure high value visual information present in the base layer. This high value visual information may be detected by any suitable method known to one of ordinary skill in the art. In an embodiment, the high value visual information is detected as part of the analyzing the section of displayed data. In an embodiment, the high value visual information is detected as part of the identifying one or more base layer objects or regions. An example of such high value visual information is the data contained in a graph displayed as part of the Japanese language labeled graph described above. Thus, the English language label translation may be displayed such that it does not obscure any of the graph. Such translocation may also involve the display of a translocation indicator. This translocation indicator may provide a visual cue to a source or original location of the original text from which the translated text is generated. For example, the translocation indicator may point to the proper location for the English language label on the graph in the example above. The translocation indicator may comprise non-transparent pixels.

The overlay can comprise one or more overlay masks. The overlay masks can be present in one or more of the augmentation layers 511-513. For example, there can be one or more augmentation layers 511-513 that contain one or more overlay masks and there can be one or more augmentation layers which do not contain an overlay mask. In some embodiments, overlay masks are present in a single augmentation layer (only one of layers 511-513). In such an embodiment, the augmentation layer can comprise all of the overlay masks present in the overlay. That is, the overlay masks are arranged into a single augmentation layer. Such an augmentation layer can be referred to as a "mask layer".

The overlay masks can comprise the non-transparent pixels as described above. Such non-transparent pixels can be opaque as described above. The overlay masks can comprise pixels which are transparent. The overlay masks are digital objects (as described above) which can be specifically useful for obscuring the original text(s). Such obscuring can be particularly advantageous in situations where the translated text(s) does not conveniently fully obscure the original text(s). Such obscuring can obscure only the original text(s), or can obscure the base layer digital object(s) and/or any portion of the base layer. The overlay masks can be related to one or more of the base layer objects. Such a relation can comprise attributes of the base layer objects, for example the vertical position, horizontal position, vertical extent, horizontal extent, color, texture, size, orientation etc. An overlay mask can form any portion of the overlay layer, including an entirety thereof. In this way, an overlay mask can obscure any portion of the base layer, including an entirety thereof. An overlay mask can be used to obscure one or more original texts and/or base layer digital objects. For example, a single overlay mask can cover only a single original text and/or base layer digital object. In one embodiment, a single overlay mask can cover more than one original text and/or base layer object. In one embodiment, multiple overlay masks can be used to obscure a single original text and/or base layer digital object.

The overlay masks may be particularly advantageous when there is a substantive change in the size or orientation of text between the original text and the translated text. Such changes may be due to, for example, an increase or decrease in overall character number, a change in font size, a change in text orientation (e.g. text read left to right being changed to text read right to left or text read vertically being changed to text read horizontally or vice-versa), or a combination of these.

In an embodiment, the pixels which comprise the overlay masks may have pixel attributes which are matched to a portion of the base layer. In an exemplary embodiment, the overlay masks may match a background color or texture present in the base layer. This matching would avoid the presence of a large off-color or unsightly shape visible to a user. The overlay mask may instead have pixels, objects, or regions which have attributes which are intended to hide the presence of the overlay mask from a user. In an example, vertically-oriented Japanese text may be translated to horizontally-oriented English text. Due to this change in orientation, the extent of the Japanese text in a vertical direction may be greater than the extent of the English text in a vertical direction. To obscure the Japanese text which is above and/or below the English translated text, the overlay may be configured such that there is an overlay object which has a greater horizontal extent which is used for displaying the English translated text and an overlay mask which is used for obscuring the vertical extent of the Japanese text not covered by the overlay object displaying the English translated text. This overlay mask may be configured to replicate a background color, texture, image, or other visual feature present in the region of the background layer to be obscured by the overlay mask while not displaying or changing the attributes of pixels which would display the original Japanese text. Thus, the presence of the overlay mask may be undetectable to a user as the overlay mask would seamlessly blend with the background of the original Japanese text but not actually display the text. The attributes of such pixels may be derived from, matched to, approximated by, interpolated from, or otherwise linked to pixels present in the base layer at the same location or near the overlay mask. In general, such derivation, detection, matching, approximation, interpolation, and the like for obtaining the attributes of such pixels may be performed as described above.

In an embodiment, the generating and overlaying of the augmentation can include a visibility check. The visibility check can be a determination of the visibility or obscuring of certain base layer elements (objects, text, etc.) by elements of the overlay. In an embodiment, the visibility check involves determining a size of translated text and a position of translated text. Such size and position of the translated text may be read from or provided by an overlayer described below. Such size and position may alternatively be read from the frame buffer. The visibility check can also involve determining the size and position of base layer elements, including the original text to be obscured and, if applicable, base layer elements which are not to be obscured. A comparison of the overlaid overlay, including the size and position of overlay elements to the base layer can then be made. Such a comparison can determine if base layer elements to be obscured are properly obscured and/or if base layer elements not to be obscured are properly visible. In an embodiment, the visibility check can involve adjusting the overlay such that the elements present in the base layer have the proper visibility (e.g. elements which are not to be obscured are visible and elements which are to be obscured are not visible). The adjusting can involve any suitable change in object or pixel parameters of objects or pixels in the overlay, the parameters as described above.

The visibility check can involve data taken from or provided by the main memory as described above. The visibility check can involve data taken from or provided by the frame buffer as described above.

The visibility check may be particularly advantageous in embodiments where the base layer elements are dynamic (e.g. videos, livestreams, etc. or user-controlled). The visibility check may be particularly advantageous for allowing or facilitating the movement of windows containing the original text. For example, the visibility check can ensure that when the original text moves, either through user-initiated or user-controlled movement or through other movement which does not involve the user (video), that proper visibility is maintained throughout an entirety of the movement. While the position and/or size of the original text can be detected or sourced from the frame buffer and/or the main memory as described above, the visibility check can be useful to correct any possible errors which may have occurred during the generation or overlaying of the overlay. The visibility check may also be particularly advantageous in embodiments where the original text or other base layer elements or properties thereof cannot be accessed through the main memory. For example, a video may be playing in a window. The window itself may not be changing position or size, but the content of the video may involve text changing position or size. Certain applications may not contain or allow access to data related to the size and/or position of text within the video through the main memory. The visibility check may also be advantageous for updating the position and/or size of translated text in cases where the original text has not changed (i.e. the text is the same information or says the same things), but has changed position and/or size without the need to re-translate the original text. Further, the visibility check may be particularly advantageous in embodiments described above in which there is a substantive change in the size or orientation of text between the original text and the translated text. Such embodiments may involve the use of masks as described above and/or translated text translocation as described above and the visibility check may be useful for ensuring proper mask placement and/or proper placement of the translated text.

In an embodiment, for each layer, attributes such as click-ability and touch-ability can be managed and orchestrated. Click-ability refers to whether a user interaction (e.g. a trigger), such as a click, causes a particular action to be performed; when click-ability is on, a trigger can cause an action to be performed, whereas when click-ability is off, a trigger does not cause an action to be performed. Touch-ability is a subset of click-ability, where the trigger is a contactless gesture from a user of the device. Such management may be at the pixel level, at the object level, or at the layer level. Click-ability may be managed directly for each pixel, being turned on or off based on attributes of the pixels. For example, pixels having a brightness below a threshold brightness may have click-ability turned off. This threshold brightness may correspond to a "greyed-out" option or button present in the display data. In another example, pixels having certain pixel location parameters may have click-ability turned on. Such pixels may correspond to a location of an interactive element present in the base layer. Pixels within layers that have click-ability off can have their click-ability turned on, while the remaining pixels in that layer remain off (and vice versa). The determination of which pixels have click-ability on and off can be determined based on parameters such as user settings, hot spots, application settings, user input, et cetera.

Controlling click-ability may be advantageous for maintaining or replicating functionality present in the base layer. For example, the base layer may comprise labeled buttons for controlling various interactive functions. Such buttons may perform various functions such as advancing or reversing slides in a slide deck, answering questions, providing feedback, or controlling options or preferences. In an exemplary embodiment, a professor or teacher may be giving a lecture to a class of students. The professor may wish to gauge the students' understanding of the material and may therefore include questions which require the students to click on or touch the correct answer. While a translation of the question and the answer options is necessary for the students to comprehend and provide an answer, a click on the choice selected by a student must be able to be registered and recorded. Overlaying the translation of the answer choices should therefore not prevent the click from being recorded as a selection by the student.

In other words, with click-ability turned on, the student can interact with button(s) on the base layer (or another layer) which may actually include an overlay on top thereof. For example, if a button is on the base layer 501 (in FIG. 5), an augmentation layer of overlay 510 (or a plurality of augmentation layers, depending on the situation), can be modified (as noted above) by the apparatus/the first device 101 to allow user interaction with the base layer in order to control the button in the displayed data on the base layer.

In embodiments where an overlay text-containing object has a different size or position compared to the base layer object or region it provides a translation for, the click-ability may be turned on for pixels which correspond to the overlay text-containing object but which do not correspond to the base layer object or region. For example, in case where there is a total text space difference (due to a factor such as character number, font size, or the like), the overlay text-containing object may be larger than its corresponding base layer object or region. When this is a translation of a button or other interactive element, a user may click in an area which appears to be the button as displayed in the overlay, but corresponds to an area outside of the button as it originally appeared in the base layer. If click-ability was only maintained in the area of the button in the base layer, that click would appear to be effective to a user, but not be registered as effective by a device. The overlay may be configured to register a click in one region of the overlay as a click corresponding to a region of the base layer. In this way, a click (or other user interaction) may be "click translocated". This may be particularly advantageous in embodiments or situations in which the overlay text-containing object(s) is (are) translocated. In this way, the click may be "passed to" an appropriate portion or region of the base layer to maintain functionality.

Figure 7:
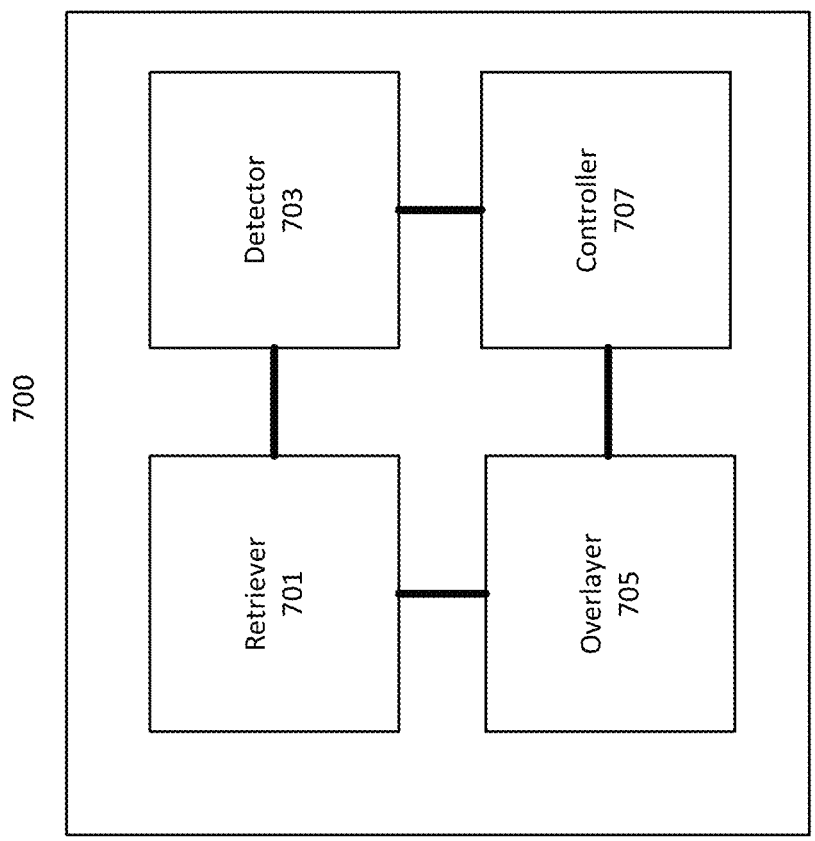
FIG. 7 illustrates a system that can be used for managing, manipulating, and merging multiple layers of content, according to an embodiment of the present disclosure.

In an embodiment, the generating and/or overlaying is achieved through the use of an overlay apparatus comprising processing circuitry configured to create a multi-layer computing experience. This overlay apparatus may be part of a first device 101 or another device 102, 10n as described above. FIG. 7 is a block diagram for an exemplary overlay apparatus 700 that can be utilized for creating a multi-layer computing experience. The overlay apparatus 700 includes processing circuitry that is configured to perform the functions of the retriever 701, detector 703, overlayer 705, and controller 707.

The retriever 701 retrieves layers from memory. For example, a first layer (e.g., the base layer), represented by a first set of pixels, is retrieved from a first portion of memory, while a second layer (e.g., the overlay or an augmentation layer), represented by a second set of pixels, is retrieved from a second portion of memory. The first and second layers can be any type of digital content. For example, the first layer can be a desktop obtained from a video/graphics card, while the second layer can be a live video of a user from a webcam. In one embodiment, the first portion of memory is a first frame buffer, and/or the second portion of memory is a second frame buffer. Of course, more than two layers can be retrieved from more than two portions of memory in other scenarios.

The detector 703 detects specific pixels and/or patterns of pixels (i.e., objects) in the first layer and/or second layer. Any detection technique appropriate for detecting a specific object can be used, such as convolutional neural networks. Examples of objects can include text, a play/pause button, volume button, and record button. Though the detector 403 is not always mandatory, it can be useful for turning on click-ability of objects in a layer that otherwise has click-ability turned off (or vice versa), highlighting certain objects, performing snap-to-grid functionalities, et cetera. The objects to be detected can be automatically detected based on various parameters made known to the detector 703, such as commonly selected objects and/or specific object requests made by a software application. Furthermore, in one embodiment, the detector 703 can also crop detected objects from their frame buffer, create another layer containing those detected objects, and display that additional layer over all the existing layers. The optical effect is that the object seems to have been "cut out" and "lifted" from its original layer. Thereafter, those objects can be altered to rotate, resize, and/or move based on inputs from a user via processing circuitry.

The detector 703 can also function to identify the reference patch, using a computer vision approach, memory vision approach, or a combination thereof as described above. Further details of how to identify and utilize such reference patches are described in U.S. provisional patent applications 63/213,326 and 63/068,878 and U.S. patent application Ser. No. 17/408,065, which are incorporated by reference herein in their entirety.

In one embodiment, a convolutional neural network (CNN) encoder adds a CCN-readable reference patch into any digital content (documents, video streams, etc.). The reference patch-encoded document is sent to (or screen shared with) a computer vision or memory vision device (e.g. the first device 101) configured to perform the computer vision and/or memory vision techniques The computer vision or memory vision device continuously scans for reference patches using the computer vision and/or memory vision techniques. If a reference patch is detected, the computer vision or memory vision device decodes the unique identifier from the reference patch. The computer vision or memory vision device, which has previously been securely authenticated, sends a secured session token and the unique identifier (obtained from the reference patch) to a remote, secured SaaS server. The server identifies the computer vision or memory vision device from the session token and determines if the computer vision or memory vision device is authorized to retrieve the specific data that the reference patch's unique identifier refers to. If the computer vision or memory vision device is authorized to retrieve the augmentation content, it is delivered electronically to the computer vision or memory vision device. The augmentation content is then added to the computer vision or memory vision device, where it visually "floats above" the operating system display and is never directly added to the operating system display layer or original digital content.

The overlayer 705 overlays the layers retrieved by the retriever 701 over one another, and adjusts pixel characteristics for one or more pixels of one or more layers. Adjusting pixel characteristics include adjusting the transparency (from anywhere between 0% to 100% translucency) of the pixels in each layer to create a semi-translucent effect, though other characteristics can also be adjusted, including but not limited to: brightness, vibrance, contrast, and color. The transparency levels of pixels can vary between different layers and/or within layers. For example, if three layers are being displayed at once, all the pixels in one layer can have no transparency, all the pixels in a second layer can have 50% transparency, and all the pixels in a third layer can have 80% transparency. Adjusting the transparency levels can affect depth perception by making certain layers and/or groups of pixels seem closer or further relative to others.

The controller 707 controls click-ability of pixels in the layers. All the pixels in a layer, or portions of pixels in the layer, can have their click-ability turned on or off. Having click-ability on refers to being able to interact with a pixel that is clicked, whereas having click-ability off refers to pixels not being affected by a click. In one embodiment, the controller 707 can turn click-ability on or off for specific pixels (e.g. utilizing an operating system executed by the circuitry of apparatus 700) based on parameters such as pixel color, pixel transparency, pixel location, et cetera.

In one embodiment, pixels in one layer have click-ability on, while pixels in the remaining layers have click-ability off. Further, portions of pixels within layers that have click-ability off can have their click-ability turned on, while the remaining pixels in that layer remain off (and vice versa). The determination of which pixels have click-ability on and off can be determined based on parameters such as user settings, hot spots, application settings, user input, et cetera. Hot spots can refer to regions of a computer program, executed by circuitry of a device 101/102/10n/150/etc., where a high percentage of the computer program's instructions occur and/or where the computer program spends a lot oft time executing its instructions Examples of hot spots can include play/pause buttons on movies, charts on presentations, specific text in documents, et cetera.

The overlayer 705 and controller 707 can work in tandem to "move" pixels between layers, where pixels in layers that otherwise look to be in the background can be brought to the forefront (or vice versa). Though the pixels themselves do not physically move, by controlling characteristics such as transparency, size, location, click-ability, color, et cetera, the end effect is a multi-layered experience, where a user interacting with such a system can view and interact with any pixel across any layer.

Additional details on exemplary method of overlaying display layers and systems for creating a multi-layer computing experience are described in U.S. provisional patent application 63/222,757, which is incorporated by reference herein in its entirety.

Embodiments of the subject matter and the functional operations described in this specification are implemented by processing circuitry, in tangibly embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of a data processing apparatus/device, (such as the server, the first device 101, or the like). The computer storage medium can be a machine-readable storage device, a machine-readable storage substrate, a random or serial access memory device, or a combination of one or more of them.

The term "data processing apparatus" refers to data processing hardware and can encompass all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which can also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, Subroutine, or other unit suitable for use in a computing environment. A computer program can, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA an ASIC.

Computers suitable for the execution of a computer program include, by way of example, general or special purpose microprocessors or both, or any other kind of central processing unit. Generally, a CPU will receive instructions and data from a read-only memory or a random access memory or both. Elements of a computer are a CPU for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more Such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients (user devices) and servers. A client and server are generally remote from each other and typically interact through a communication network. The relationship of client and server arises by virtue of computer programs running on the respective computers and having a client-server relationship to each other. In an embodiment, a server transmits data, e.g., an HTML page, to a user device, e.g., for purposes of displaying data to and receiving user input from a user interacting with the user device, which acts as a client. Data generated at the user device, e.g., a result of the user interaction, can be received from the user device at the server.

Electronic device 800 shown in FIG. 8 can be an example of one or more of the devices shown in FIG. 1. In an embodiment, device 800 can be a smartphone. However, the skilled artisan will appreciate that the features described herein can be adapted to be implemented on other devices (e.g., a laptop, a tablet, a server, an e-reader, a camera, a navigation device, etc.). The device 800 of FIG. 8 includes processing circuitry, as discussed above. The processing circuitry includes one or more of the elements discussed next with reference to FIG. 8. The device 800 can include other components not explicitly illustrated in FIG. 8, such as a CPU, GPU, frame buffer, etc. The device 800 includes a controller 810 and a wireless communication processor 802 connected to an antenna 801. A speaker 804 and a microphone 805 are connected to a voice processor 803.

The controller 810 can include one or more processors/processing circuitry (CPU, GPU, or other circuitry) and can control each element in the device 800 to perform functions related to communication control, audio signal processing, graphics processing, control for the audio signal processing, still and moving image processing and control, and other kinds of signal processing. The controller 810 can perform these functions by executing instructions stored in a memory 850. Alternatively or in addition to the local storage of the memory 850, the functions can be executed using instructions stored on an external device accessed on a network or on a non-transitory computer readable medium.

The memory 850 includes but is not limited to Read Only Memory (ROM), Random Access Memory (RAM), or a memory array including a combination of volatile and non-volatile memory units. The memory 850 can be utilized as working memory by the controller 810 while executing the processes and algorithms of the present disclosure. Additionally, the memory 850 can be used for long-term storage, e.g., of image data and information related thereto.

The device 800 includes a control line CL and data line DL as internal communication bus lines. Control data to/from the controller 810 can be transmitted through the control line CL. The data line DL can be used for transmission of voice data, display data, etc.

The antenna 801 transmits/receives electromagnetic wave signals between base stations for performing radio-based communication, such as the various forms of cellular telephone communication. The wireless communication processor 802 controls the communication performed between the device 800 and other external devices via the antenna 801. For example, the wireless communication processor 802 can control communication between base stations for cellular phone communication.

The speaker 804 emits an audio signal corresponding to audio data supplied from the voice processor 803. The microphone 805 detects surrounding audio and converts the detected audio into an audio signal. The audio signal can then be output to the voice processor 803 for further processing. The voice processor 803 demodulates and/or decodes the audio data read from the memory 850 or audio data received by the wireless communication processor 802 and/or a short-distance wireless communication processor 807. Additionally, the voice processor 803 can decode audio signals obtained by the microphone 805.

The exemplary device 800 can also include a display 820, a touch panel 830, an operation key 840, and a short-distance communication processor 807 connected to an antenna 806. The display 820 can be an LCD, an organic electroluminescence display panel, or another display screen technology. In addition to displaying still and moving image data, the display 820 can display operational inputs, such as numbers or icons which can be used for control of the device 800. The display 820 can additionally display a GUI for a user to control aspects of the device 800 and/or other devices. Further, the display 820 can display characters and images received by the device 800 and/or stored in the memory 850 or accessed from an external device on a network. For example, the device 800 can access a network such as the Internet and display text and/or images transmitted from a Web server.

The touch panel 830 can include a physical touch panel display screen and a touch panel driver. The touch panel 830 can include one or more touch sensors for detecting an input operation on an operation surface of the touch panel display screen. The touch panel 830 also detects a touch shape and a touch area. Used herein, the phrase "touch operation" refers to an input operation performed by touching an operation surface of the touch panel display with an instruction object, such as a finger, thumb, or stylus-type instrument. In the case where a stylus or the like is used in a touch operation, the stylus can include a conductive material at least at the tip of the stylus such that the sensors included in the touch panel 830 can detect when the stylus approaches/contacts the operation surface of the touch panel display (similar to the case in which a finger is used for the touch operation).

In certain aspects of the present disclosure, the touch panel 830 can be disposed adjacent to the display 820 (e.g., laminated) or can be formed integrally with the display 820. For simplicity, the present disclosure assumes the touch panel 830 is formed integrally with the display 820 and therefore, examples discussed herein can describe touch operations being performed on the surface of the display 820 rather than the touch panel 830. However, the skilled artisan will appreciate that this is not limiting.

For simplicity, the present disclosure assumes the touch panel 830 is a capacitance-type touch panel technology. However, it should be appreciated that aspects of the present disclosure can easily be applied to other touch panel types (e.g., resistance-type touch panels) with alternate structures. In certain aspects of the present disclosure, the touch panel 830 can include transparent electrode touch sensors arranged in the X-Y direction on the surface of transparent sensor glass.

The touch panel driver can be included in the touch panel 830 for control processing related to the touch panel 830, such as scanning control. For example, the touch panel driver can scan each sensor in an electrostatic capacitance transparent electrode pattern in the X-direction and Y-direction and detect the electrostatic capacitance value of each sensor to determine when a touch operation is performed. The touch panel driver can output a coordinate and corresponding electrostatic capacitance value for each sensor. The touch panel driver can also output a sensor identifier that can be mapped to a coordinate on the touch panel display screen. Additionally, the touch panel driver and touch panel sensors can detect when an instruction object, such as a finger is within a predetermined distance from an operation surface of the touch panel display screen. That is, the instruction object does not necessarily need to directly contact the operation surface of the touch panel display screen for touch sensors to detect the instruction object and perform processing described herein. For example, in an embodiment, the touch panel 830 can detect a position of a user's finger around an edge of the display panel 820 (e.g., gripping a protective case that surrounds the display/touch panel). Signals can be transmitted by the touch panel driver, e.g. in response to a detection of a touch operation, in response to a query from another element based on timed data exchange, etc.

The touch panel 830 and the display 820 can be surrounded by a protective casing, which can also enclose the other elements included in the device 800. In an embodiment, a position of the user's fingers on the protective casing (but not directly on the surface of the display 820) can be detected by the touch panel 830 sensors. Accordingly, the controller 810 can perform display control processing described herein based on the detected position of the user's fingers gripping the casing. For example, an element in an interface can be moved to a new location within the interface (e.g., closer to one or more of the fingers) based on the detected finger position.

Further, in an embodiment, the controller 810 can be configured to detect which hand is holding the device 800, based on the detected finger position. For example, the touch panel 830 sensors can detect a plurality of fingers on the left side of the device 800 (e.g., on an edge of the display 820 or on the protective casing), and detect a single finger on the right side of the device 800. In this exemplary scenario, the controller 810 can determine that the user is holding the device 800 with his/her right hand because the detected grip pattern corresponds to an expected pattern when the device 800 is held only with the right hand.

The operation key 840 can include one or more buttons or similar external control elements, which can generate an operation signal based on a detected input by the user. In addition to outputs from the touch panel 830, these operation signals can be supplied to the controller 810 for performing related processing and control. In certain aspects of the present disclosure, the processing and/or functions associated with external buttons and the like can be performed by the controller 810 in response to an input operation on the touch panel 830 display screen rather than the external button, key, etc. In this way, external buttons on the device 800 can be eliminated in lieu of performing inputs via touch operations, thereby improving watertightness.

The antenna 806 can transmit/receive electromagnetic wave signals to/from other external apparatuses, and the short-distance wireless communication processor 807 can control the wireless communication performed between the other external apparatuses. Bluetooth, IEEE 802.11, and near-field communication (NFC) are non-limiting examples of wireless communication protocols that can be used for inter-device communication via the short-distance wireless communication processor 807.

The device 800 can include a motion sensor 808. The motion sensor 808 can detect features of motion (i.e., one or more movements) of the device 800. For example, the motion sensor 808 can include an accelerometer to detect acceleration, a gyroscope to detect angular velocity, a geomagnetic sensor to detect direction, a geo-location sensor to detect location, etc., or a combination thereof to detect motion of the device 800. In certain embodiments, the motion sensor 808 can generate a detection signal that includes data representing the detected motion. For example, the motion sensor 808 can determine a number of distinct movements in a motion (e.g., from start of the series of movements to the stop, within a predetermined time interval, etc.), a number of physical shocks on the device 800 (e.g., a jarring, hitting, etc., of the electronic device), a speed and/or acceleration of the motion (instantaneous and/or temporal), or other motion features. The detected motion features can be included in the generated detection signal. The detection signal can be transmitted, e.g., to the controller 810, whereby further processing can be performed based on data included in the detection signal. The motion sensor 808 can work in conjunction with a Global Positioning System (GPS) section 860. The information of the present position detected by the GPS section 860 is transmitted to the controller 810. An antenna 861 is connected to the GPS section 860 for receiving and transmitting signals to and from a GPS satellite.

The device 800 can include a camera section 809, which includes a lens and shutter for capturing photographs of the surroundings around the device 800. In an embodiment, the camera section 809 captures surroundings of an opposite side of the device 800 from the user. The images of the captured photographs can be displayed on the display panel 820. A memory section saves the captured photographs. The memory section can reside within the camera section 809 or it can be part of the memory 850. The camera section 809 can be a separate feature attached to the device 800 or it can be a built-in camera feature.

An example of a type of computer is shown in FIG. 9. The computer 900 can be used for the operations described in association with any of the computer-implement methods described previously, according to one implementation. For example, the computer 900 can be an example of devices 101, 102, 10*n*, 120, or a server, such as device 150. The computer 900 includes processing circuitry, as discussed above. The device can include other components not explicitly illustrated in FIG. 9, such as a CPU, GPU, frame buffer, etc. The processing circuitry includes one or more of the elements discussed next with reference to FIG. 9. In FIG. 9, the computer 900 includes a processor 910, a memory 920, a storage device 930, and an input/output device 940. Each of the components 910, 920, 930, and 940 are interconnected using a system bus 950. The processor 910 is capable of processing instructions for execution within the system 900. In one implementation, the processor 910 is a single-threaded processor. In another implementation, the processor 910 is a multi-threaded processor. The processor 910 is capable of processing instructions stored in the memory 920 or on the storage device 930 to display graphical information for a user interface on the input/output device 940.

The memory 920 stores information within the computer 900. In one implementation, the memory 920 is a computer-readable medium. In one implementation, the memory 920 is a volatile memory. In another implementation, the memory 920 is a non-volatile memory.

The storage device 930 is capable of providing mass storage for the system 900. In one implementation, the storage device 930 is a computer-readable medium. In various different implementations, the storage device 930 can be a floppy disk device, a hard disk device, an optical disk device, or a tape device.

The input/output device 940 provides input/output operations for the computer 900. In one implementation, the input/output device 940 includes a keyboard and/or pointing device. In another implementation, the input/output device 940 includes a display for displaying graphical user interfaces.

Next, a hardware description of a device according to exemplary embodiments is described with reference to FIG. 10. In FIG. 10, the device, which can be the above-described devices of FIG. 1, includes processing circuitry, as discussed above. The processing circuitry includes one or more of the elements discussed next with reference to FIG. 10. The device may include other components not explicitly illustrated in FIG. 10, such as a CPU, GPU, frame buffer, etc. In FIG. 10, the device/server includes a CPU 1000 which performs the processes described above/below. The process data and instructions can be stored in memory 1002. These processes and instructions can also be stored on a storage medium disk 1004 such as a hard drive (HDD) or portable storage medium or can be stored remotely. Further, the claimed advancements are not limited by the form of the computer-readable media on which the instructions of the inventive process are stored. For example, the instructions can be stored on CDs, DVDs, in FLASH memory, RAM, ROM, PROM, EPROM, EEPROM, hard disk or any other information processing device with which the device communicates, such as a server or computer.

Further, the claimed advancements can be provided as a utility application, background daemon, or component of an operating system, or combination thereof, executing in conjunction with CPU 1000 and an operating system such as Microsoft Windows, UNIX, Solaris, LINUX, Apple MAC-OS and other systems known to those skilled in the art.

The hardware elements in order to achieve the device can be realized by various circuitry elements, known to those skilled in the art. For example, CPU 1000 can be a Xenon or Core processor from Intel of America or an Opteron processor from AMD of America, or can be other processor types that would be recognized by one of ordinary skill in the art. Alternatively, the CPU 1000 can be implemented on an FPGA, ASIC, PLD or using discrete logic circuits, as one of ordinary skill in the art would recognize. Further, CPU 1000 can be implemented as multiple processors cooperatively working in parallel to perform the instructions of the processes described above. CPU 1000 can be an example of the CPU illustrated in each of the devices of FIG. 1.

The device in FIG. 10 also includes a network controller 1006, such as an Intel Ethernet PRO network interface card from Intel Corporation of America, for interfacing with network 1050 (also shown in FIG. 1 as 150). As can be appreciated, the network 1050 can be a public network, such as the Internet, or a private network such as an LAN or WAN network, or any combination thereof and can also include PSTN or ISDN sub-networks. The network 1050 can also be wired, such as an Ethernet network, or can be wireless such as a cellular network including EDGE, 3G, 4G and 5G wireless cellular systems. The wireless network can also be WiFi, Bluetooth, or any other wireless form of communication that is known.

The device further includes a display controller 1008, such as a NVIDIA GeForce GTX or Quadro graphics adaptor from NVIDIA Corporation of America for interfacing with display 1010, such as an LCD monitor. A general purpose I/O interface 1012 interfaces with a keyboard and/or mouse 1014 as well as a touch screen panel 1016 on or separate from display 1010. General purpose I/O interface also connects to a variety of peripherals 1018 including printers and scanners.

A sound controller 1020 is also provided in the device to interface with speakers/microphone 1022 thereby providing sounds and/or music.

The general purpose storage controller 1024 connects the storage medium disk 1004 with communication bus 1026, which can be an ISA, EISA, VESA, PCI, or similar, for interconnecting all of the components of the device. A description of the general features and functionality of the display 1010, keyboard and/or mouse 1014, as well as the display controller 1008, storage controller 1024, network controller 1006, sound controller 1020, and general purpose I/O interface 1012 is omitted herein for brevity as these features are known.

Figure 11:
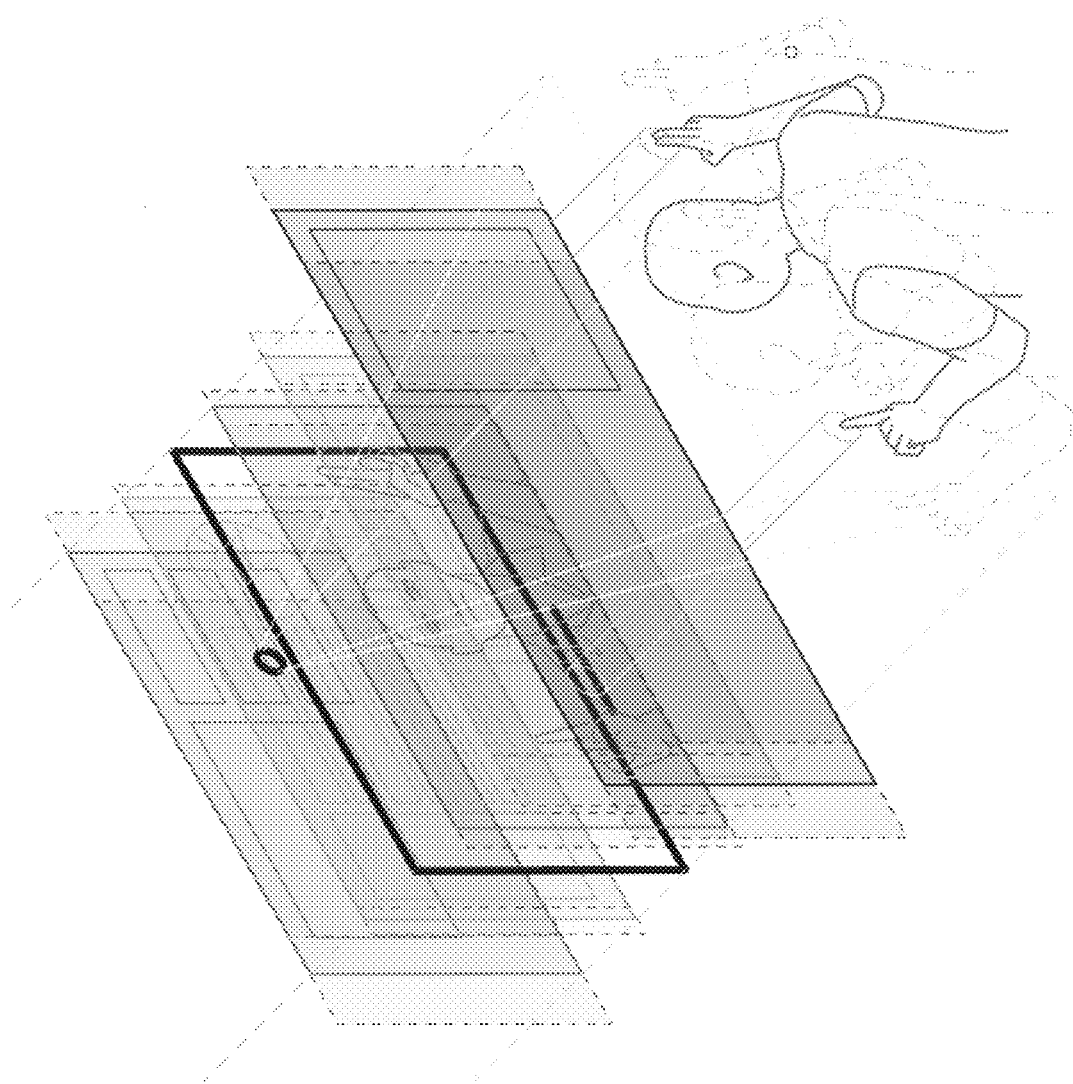
FIG. 11 is an example of Transparent Computing.

As shown in FIG. 11, in some embodiments, one or more of the disclosed functions and capabilities may be used to enable a volumetric composite of content-activated layers of Transparent Computing, content-agnostic layers of Transparent Computing and/or camera-captured layers of Transparent Computing placed visibly behind 2-dimensional or 3-dimensional content displayed on screens, placed in front of 2-dimensional or 3-dimensional content displayed on screens, placed inside of 3-dimensional content displayed on screens and/or placed virtually outside of the display of screens. Users can interact via Touchless Computing with any layer in a volumetric composite of layers of Transparent Computing wherein a user's gaze, gestures, movements, position, orientation, or other characteristics observed by a camera are used as the basis for selecting and interacting with objects in any layer in the volumetric composite of layers of Transparent Computing to execute processes on computing devices.

In some embodiments, one or more of the disclosed functions and capabilities may be used to enable users to see a volumetric composite of layers of Transparent Computing from a 360-degree Optical Lenticular Perspective wherein a user's gaze, gestures, movements, position, orientation, or other characteristics observed by cameras are a basis to calculate, derive and/or predict the 360-degree Optical Lenticular Perspective from which users see the volumetric composite of layers of Transparent Computing displayed on screens. Further, users can engage with a 3-dimensional virtual environment displayed on screens consisting of layers of Transparent Computing placed behind the 3-dimensional virtual environment displayed on screens, placed in front of a 3-dimensional virtual environment displayed on screens, and/or placed inside of the a 3-dimensional virtual environment displayed on screens wherein users can select and interact with objects in any layer of Transparent Computing to execute processes on computing devices while looking at the combination of the 3-dimensional virtual environment and the volumetric composite of layers of Transparent Computing from any angle of the 360-degree Optical Lenticular Perspective available to users.

While this specification contains many specific implementation details, these should not be construed as limitations on the scope of what can be claimed, but rather as descriptions of features that can be specific to particular embodiments.

Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features can be described above as acting in certain combinations and even initially claimed as such, one or more features from a claimed combination can in some cases be excised from the combination, and the claimed combination can be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing can be advantageous.

Obviously, numerous modifications and variations are possible in light of the above teachings. It is therefore to be understood that within the scope of the appended claims, embodiments of the present disclosure may be practiced otherwise than as specifically described herein.

Embodiments of the present disclosure may also be as set forth in the following parentheticals.

(1) An apparatus, comprising processing circuitry, including a graphics processing unit (GPU), configured to access a frame buffer of the GPU, analyze, in the frame buffer of the GPU, a frame representing a section of a stream of displayed data that is being displayed by a display device, based on the analyzed frame, identify a reference patch that includes an instruction to identify an object comprising original text, based on the instruction included in the reference patch, recognize the original text, generate translated text by translating the original text, generate an overlay comprising an augmentation layer, the augmentation layer including the translated text, and overlay the overlay onto the displayed data such that the translated text is viewable while the original text is obscured from view.

(2) The apparatus of (1), wherein the overlay further comprises an overlay mask that includes non-transparent pixels, the overlay mask obscuring the original text from view and being in a different area of the augmentation layer than the translated text.

(3) The apparatus of any one of (1) to (2), wherein the processing circuitry is configured to, prior to overlaying the overlay determine a size of the translated text and a position of the translated text, determine an obscuring of elements present in the displayed data which are different from the original text, and adjust the overlay such that the elements present in the displayed data which are different from the original text are not obscured.

(4) The apparatus of any one of (1) to (3), wherein the instruction included in the reference patch includes an indication of a translation language target, which is an indication of a language in which the original text is to be translated into.

(5) The apparatus of any one of (1) to (4), wherein the processing circuitry is configured to generate the translated text by transmitting to a translation apparatus a translation request comprising the original text and a translation language target, and receiving from the translation apparatus the translated text.

(6) The apparatus of any one of (1) to (5), wherein the processing circuitry is configured to modify the overlay to allow user interaction with an interactive element in the displayed data (7) A method, comprising accessing a frame buffer of a graphics processing unit (GPU), analyzing, in the frame buffer of the GPU, a frame representing a section of a stream of displayed data that is being displayed by a display device, based on the analyzed frame, identifying a reference patch that includes an instruction to identify an object comprising original text, based on the instruction included in the reference patch, recognizing the original text, generating translated text by translating the original text, generating an overlay comprising an augmentation layer, the augmentation layer including the translated text, and overlaying the overlay, onto the displayed data such that the translated text is viewable while the original text is obscured from view.

(8) The method of (7), wherein the overlay further comprises an overlay mask that includes non-transparent pixels, the overlay mask obscuring the original text from view and being in a different area of the augmentation layer than the translated text.

(9) The method of any one of (1) to (8), wherein further comprising, prior to overlaying the overlay determining a size of the translated text and a position of the translated text, determining an obscuring of elements present in the displayed data which are different from the original text, and adjusting the overlay such that the elements present in the displayed data which are different from the original text are not obscured.

(10) The method of any one of (7) to (9), wherein the instruction included in the reference patch includes an indication of a translation language target, which is an indication of a language in which the original text is to be translated into.

(11) The method of any one of (7) to (10), wherein the generating generates the translated text by transmitting to a translation apparatus a translation request comprising the original text and a translation language target and receiving from the translation apparatus the translated text.

(12) The method of any one of (7) to (11), further comprising modifying the overlay to allow user interaction with an interactive element in the displayed data.

(13) A non-transitory computer-readable storage medium for storing computer-readable instructions that, when executed by a computer, cause the computer to perform a method, the method comprising accessing a frame buffer of a graphics processing unit (GPU), analyzing, in the frame buffer of the GPU, a frame representing a section of a stream of displayed data that is being displayed by a display device, based on the analyzed frame, identifying a reference patch that includes an instruction to identify an object comprising original text, based on the instruction included in the reference patch, recognizing the original text, generating translated text by translating the original text, generating an overlay comprising an augmentation layer, the augmentation layer including the translated text, and overlaying the overlay, onto the displayed data such that the translated text is viewable while the original text is obscured from view.

(14) The non-transitory computer-readable storage medium of (13), wherein the overlay further comprises an overlay mask that includes non-transparent pixels, the overlay mask obscuring the original text from view and being in a different area of the augmentation layer than the translated text.

(15) The non-transitory computer-readable storage medium of any one of (13) to (14), further comprising, prior to overlaying the overlay determining a size of the translated text and a position of the translated text, determining an obscuring of elements present in the displayed data which are different from the original text, and adjusting the overlay such that the elements present in the displayed data which are different from the original text are not obscured.

(16) The non-transitory computer-readable storage medium of any one of (13) to (15), wherein the instruction included in the reference patch includes an indication of a translation language target, which is an indication of a language in which the original text is to be translated into.

(17) The non-transitory computer-readable storage medium of any one of (13) to (16), wherein the generating generates the translated text by transmitting to a translation apparatus a translation request comprising the original text and a translation language target and receiving from the translation apparatus the translated text.

(18) The non-transitory computer-readable storage medium of any one of (13) to (17) further comprising modifying the overlay to allow user interaction with an interactive element in the displayed data.

Thus, the foregoing discussion discloses and describes merely exemplary embodiments of the present disclosure. It should be understood that the present disclosure can be embodied in other specific forms without departing from the spirit thereof. Accordingly, the disclosure of the present disclosure is intended to be illustrative, but not limiting of the scope of the disclosure, as well as other claims. The disclosure, including any readily discernible variants of the teachings herein, defines, in part, the scope of the foregoing claim terminology such that no inventive subject matter is dedicated to the public.

The invention claimed is:

1. An apparatus, comprising:
   processing circuitry, including a graphics processing unit (GPU), configured to access a frame buffer of the GPU,
   analyze, in the frame buffer of the GPU, a frame representing a section of a stream of displayed data that is being displayed by a display device,
   based on the analyzed frame, identify a reference patch in the frame buffer that includes an instruction to identify an object comprising original text on an original layer, the reference patch identifying an available area in which translated text is insertable in the displayed data that is being displayed by the apparatus and a screen position within the available area at which the translated text is insertable into the displayed data,
   based on the instruction included in the reference patch, recognize the original text,
   receive the translated text, the translated text being a translation of the original text,
   generate an overlay positioned on top of the original layer, the overlay comprising an augmentation layer, the augmentation layer including the translated text, a position of the translated text on the augmentation layer determined, at least in part, by the reference patch, and
   overlay the overlay onto the displayed data of the original layer such that the translated text is viewable while the original text is obscured from view.

2. The apparatus of claim 1, wherein the overlay further comprises an overlay mask that includes non-transparent pixels, the overlay mask obscuring the original text from view and being in a different area of the augmentation layer than the translated text.

3. The apparatus of claim 1, wherein
   the overlay includes a plurality of augmentation layers, and
   the processing circuitry is configured to, prior to overlaying the overlay
     determine a size of the translated text,
     determine an obscuring of elements present in the displayed data which are different from the original text, and
     adjust the overlay, which includes the plurality of augmentation layers, such that the elements present in the displayed data which are different from the original text are not obscured.

4. The apparatus of claim 1, wherein the instruction included in the reference patch includes an indication of a translation language target, which is an indication of a language in which the original text is to be translated into.

5. The apparatus of claim 1, wherein the processing circuitry is configured to
   receive the translated text from a translation apparatus.

6. The apparatus of claim 1, wherein the processing circuitry is configured to modify the overlay to allow user interaction with an interactive element in the displayed data.

7. The apparatus of claim 1, wherein the overlay comprises a plurality of augmentation layers, each of the plurality of augmentation layers including translated text.

8. A method, comprising:
   accessing a frame buffer of a graphics processing unit (GPU);
   analyzing, in the frame buffer of the GPU, a frame representing a section of a stream of displayed data that is being displayed by a display device;
   based on the analyzed frame, identifying a reference patch in the frame buffer that includes an instruction to identify an object comprising original text on an original layer, the reference patch identifying an available area in which translated text is insertable in the displayed data that is being displayed and a screen position within the available area at which the translated text is insertable into the displayed data;

based on the instruction included in the reference patch, recognizing the original text;
receiving the translated text, the translated text being a translation of the original text;
generating an overlay positioned on top of the original layer, the overlay comprising an augmentation layer, the augmentation layer including the translated text, a position of the translated text on the augmentation layer determined, at least in part, by the reference patch; and
overlaying the overlay onto the displayed data of the original layer such that the translated text is viewable while the original text is obscured from view.

9. The method of claim 8, wherein the overlay further comprises an overlay mask that includes non-transparent pixels, the overlay mask obscuring the original text from view and being in a different area of the augmentation layer than the translated text.

10. The method of claim 8, further comprising, prior to overlaying the overlay:
determining a size of the translated text;
determining an obscuring of elements present in the displayed data which are different from the original text; and
adjusting the overlay such that the elements present in the displayed data which are different from the original text are not obscured.

11. The method of claim 8, wherein the instruction in the reference patch includes an indication of a translation language target, which is an indication of a language in which the original text is to be translated into.

12. The method of claim 8, wherein the
receiving of the translated text is from a translation apparatus.

13. The method of claim 8, further comprising:
modifying the overlay to allow user interaction with an interactive element in the displayed data.

14. A non-transitory computer-readable storage medium for storing computer-readable instructions that, when executed by a computer, cause the computer to perform a method, the method comprising:
accessing a frame buffer of a graphics processing unit (GPU);
analyzing, in the frame buffer of the GPU, a frame representing a section of a stream of displayed data that is being displayed by a display device;
based on the analyzed frame, identifying a reference patch in the frame buffer that includes an instruction to identify an object comprising original text on an original layer, the reference patch identifying an available area in which translated text is insertable in the displayed data that is being displayed and a screen position within the available area at which the translated text is insertable into the displayed data;
based on the instruction included in the reference patch, recognizing the original text;
receiving the translated text, the translated text being a translation of the original text;
generating an overlay positioned on top of the original layer, the overlay comprising an augmentation layer, the augmentation layer including the translated text, a position of the translated text on the augmentation layer determined, at least in part, by the reference patch; and
overlaying the overlay onto the displayed data of the original layer such that the translated text is viewable while the original text is obscured from view.

15. The non-transitory computer-readable storage medium of claim 14, wherein the overlay further comprises an overlay mask that includes non-transparent pixels, the overlay mask obscuring the original text from view and being in a different area of the augmentation layer than the translated text.

16. The non-transitory computer-readable storage medium of claim 14, further comprising, prior to overlaying the overlay:
determining a size of the translated text;
determining an obscuring of elements present in the displayed data which are different from the original text; and
adjusting the overlay such that the elements present in the displayed data which are different from the original text are not obscured.

17. The non-transitory computer-readable storage medium of claim 14, wherein the instruction included in the reference patch includes an indication of a translation language target, which is an indication of a language in which the original text is to be translated into.

18. The non-transitory computer-readable storage medium of claim 14, wherein the
receiving of the translated text is from a translation apparatus.

19. The non-transitory computer-readable storage medium of claim 14, further comprising:
modifying the overlay to allow user interaction with an interactive element in the displayed data.

* * * * *